(12) United States Patent
Ehrhart

(10) Patent No.: US 8,794,522 B2
(45) Date of Patent: *Aug. 5, 2014

(54) IMAGE CAPTURE APPARATUS AND METHOD

(71) Applicant: Hand Held Products, Inc., Fort Mill, SC (US)

(72) Inventor: Michael A. Ehrhart, Liverpool, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,851

(22) Filed: May 13, 2013

(65) Prior Publication Data

US 2013/0313326 A1  Nov. 28, 2013

Related U.S. Application Data

(62) Division of application No. 12/480,474, filed on Jun. 8, 2009, now Pat. No. 8,439,262, which is a division of application No. 11/442,662, filed on May 25, 2006, now Pat. No. 7,543,747, which is a division of application No. 09/858,163, filed on May 15, 2001, now Pat. No. 7,111,787.

(51) Int. Cl.
*G06K 7/10* (2006.01)

(52) U.S. Cl.
USPC .................. 235/454; 235/462.45; 235/472.01

(58) Field of Classification Search
USPC .................. 235/454, 462.12, 462.14, 462.25, 235/462.41, 462.45, 472, 472.01
See application file for complete search history.

(56) References Cited

U.S. PATENT DOCUMENTS

| | | | |
|---|---|---|---|
| 3,801,775 | A | 4/1974 | Acker |
| 3,902,047 | A | 8/1975 | Tyler et al. |
| 4,020,463 | A | 4/1977 | Himmel |
| 4,091,270 | A | 5/1978 | Musch et al. |
| 4,286,255 | A | 8/1981 | Siy |

(Continued)

FOREIGN PATENT DOCUMENTS

| | | |
|---|---|---|
| EP | 0350933 A2 | 1/1990 |
| EP | 0392159 A2 | 10/1990 |

(Continued)

OTHER PUBLICATIONS

Gonzalez; Woods, "Digital Image Processing," Library of Congress, 10 pg. article, pp. 417-425 and pp. 452-457; Copyright 1992 by Addison Wesley Publishing Company, Inc.

(Continued)

*Primary Examiner* — Daniel St Cyr
(74) *Attorney, Agent, or Firm* — Additon, Higgins, Pendleton & Ashe, P.A.

(57) ABSTRACT

There is provided an image capture apparatus and method. An image capture device can be used in the decoding of a decodable indicia, e.g., bar code symbols and/or text characters and can further be used in the capture of one or more images that may or may not be subjected to decoding processes. In one embodiment, an image captured with use of an image capture device is an image of an item bearing a decodable indicia. In one embodiment, an image capture device can have a plurality of user selectable modes of operation.

17 Claims, 13 Drawing Sheets

(56) References Cited

U.S. PATENT DOCUMENTS

| | | |
|---|---|---|
| 4,335,303 A | 6/1982 | Call |
| 4,387,298 A | 6/1983 | Petersen et al. |
| 4,499,372 A | 2/1985 | Nakano |
| 4,530,584 A | 7/1985 | Schmidt |
| 4,544,064 A | 10/1985 | Felder |
| 4,562,592 A | 12/1985 | Chainer et al. |
| 4,581,762 A | 4/1986 | Lapidus et al. |
| 4,588,211 A | 5/1986 | Greene |
| 4,656,591 A | 4/1987 | Goldberg |
| 4,760,248 A | 7/1988 | Swartz et al. |
| 4,776,464 A | 10/1988 | Miller et al. |
| 4,794,239 A | 12/1988 | Allais |
| 4,825,058 A | 4/1989 | Poland |
| 4,832,204 A | 5/1989 | Handy et al. |
| 4,835,372 A | 5/1989 | Gombrich et al. |
| 4,855,842 A | 8/1989 | Hayes et al. |
| 4,858,000 A | 8/1989 | Lu |
| 4,868,375 A | 9/1989 | Blanford |
| 4,868,757 A | 9/1989 | Gil |
| 4,873,426 A | 10/1989 | Sarna et al. |
| 4,877,948 A | 10/1989 | Krueger |
| 4,877,949 A | 10/1989 | Danielson et al. |
| 4,924,078 A | 5/1990 | Sant'Anselmo et al. |
| 4,948,955 A | 8/1990 | Lee et al. |
| 4,972,494 A | 11/1990 | White et al. |
| 4,983,818 A | 1/1991 | Knowles |
| 5,010,241 A | 4/1991 | Butterworth |
| 5,019,699 A | 5/1991 | Koenck |
| 5,039,391 A | 8/1991 | Reid et al. |
| 5,039,847 A | 8/1991 | Morii et al. |
| 5,043,908 A | 8/1991 | Manduley et al. |
| 5,050,223 A | 9/1991 | Sumi et al. |
| 5,054,102 A | 10/1991 | Gaborski |
| 5,070,805 A | 12/1991 | Plante |
| 5,091,945 A | 2/1992 | Kleijn |
| 5,102,110 A | 4/1992 | Reynolds |
| 5,103,489 A | 4/1992 | Miette et al. |
| 5,108,612 A | 4/1992 | Flaig et al. |
| 5,120,940 A | 6/1992 | Willsie |
| 5,134,669 A | 7/1992 | Keogh et al. |
| 5,138,140 A | 8/1992 | Siemiatkowski et al. |
| 5,138,141 A | 8/1992 | Blanford et al. |
| 5,180,904 A | 1/1993 | Shepard et al. |
| 5,199,081 A | 3/1993 | Saito et al. |
| 5,199,084 A | 3/1993 | Kishi et al. |
| 5,212,777 A | 5/1993 | Gove et al. |
| 5,237,161 A | 8/1993 | Grodevant |
| 5,237,625 A | 8/1993 | Yamashita et al. |
| 5,243,655 A | 9/1993 | Wang |
| 5,260,554 A | 11/1993 | Grodevant |
| 5,262,623 A | 11/1993 | Batterman et al. |
| 5,262,871 A | 11/1993 | Wilder et al. |
| 5,278,399 A | 1/1994 | Sano et al. |
| 5,291,243 A | 3/1994 | Heckman et al. |
| 5,296,689 A | 3/1994 | Reddersen et al. |
| 5,296,690 A | 3/1994 | Chandler et al. |
| 5,296,960 A | 3/1994 | Ellingson et al. |
| 5,299,116 A | 3/1994 | Owens et al. |
| 5,301,243 A | 4/1994 | Olschafskie et al. |
| 5,304,423 A | 4/1994 | Niknafs et al. |
| 5,304,786 A | 4/1994 | Pavlidis et al. |
| 5,307,423 A | 4/1994 | Gupta et al. |
| 5,313,051 A | 5/1994 | Brigida et al. |
| 5,317,388 A | 5/1994 | Surka et al. |
| 5,331,151 A | 7/1994 | Cochran et al. |
| 5,331,176 A | 7/1994 | Sant' Anselmo et al. |
| 5,337,361 A | 8/1994 | Wang et al. |
| 5,354,977 A | 10/1994 | Roustaei |
| 5,365,048 A | 11/1994 | Komiya et al. |
| 5,375,226 A | 12/1994 | Sano et al. |
| 5,378,883 A | 1/1995 | Batterman et al. |
| 5,392,447 A | 2/1995 | Schlack et al. |
| 5,396,054 A | 3/1995 | Krichever et al. |
| 5,399,846 A | 3/1995 | Pavlidis et al. |
| 5,410,141 A | 4/1995 | Koenck et al. |
| 5,413,383 A | 5/1995 | Laurash et al. |
| 5,414,251 A | 5/1995 | Durbin |
| 5,420,403 A | 5/1995 | Allum et al. |
| 5,420,943 A | 5/1995 | Mak |
| 5,421,778 A | 6/1995 | Kouramanis et al. |
| 5,422,470 A | 6/1995 | Kubo et al. |
| 5,428,211 A | 6/1995 | Zheng et al. |
| 5,428,212 A | 6/1995 | Tani et al. |
| 5,448,375 A | 9/1995 | Cooper et al. |
| 5,449,201 A | 9/1995 | Miller et al. |
| 5,467,411 A | 11/1995 | Tanaka et al. |
| 5,471,533 A | 11/1995 | Wang et al. |
| 5,489,158 A | 2/1996 | Wang et al. |
| 5,489,769 A | 2/1996 | Kubo et al. |
| 5,496,992 A | 3/1996 | Madan et al. |
| 5,504,322 A | 4/1996 | Pavlidis et al. |
| 5,504,367 A | 4/1996 | Arackellian et al. |
| 5,506,697 A | 4/1996 | Li et al. |
| 5,508,818 A | 4/1996 | Hamma |
| 5,513,017 A | 4/1996 | Knodt et al. |
| 5,513,264 A | 4/1996 | Wang et al. |
| 5,521,366 A | 5/1996 | Wang et al. |
| 5,521,523 A | 5/1996 | Kimura et al. |
| 5,550,364 A | 8/1996 | Rudeen |
| 5,550,366 A | 8/1996 | Roustaei |
| 5,557,091 A | 9/1996 | Krummel |
| 5,557,095 A | 9/1996 | Clark et al. |
| 5,557,519 A | 9/1996 | Morita et al. |
| 5,570,135 A | 10/1996 | Gove et al. |
| 5,574,519 A | 11/1996 | Manico et al. |
| 5,581,636 A | 12/1996 | Skinger |
| 5,591,955 A | 1/1997 | Laser |
| 5,591,956 A | 1/1997 | Longacre, Jr. et al. |
| 5,594,778 A | 1/1997 | Schaupp, Jr. et al. |
| 5,598,007 A | 1/1997 | Bunce et al. |
| 5,602,382 A | 2/1997 | Ulvr et al. |
| 5,607,187 A | 3/1997 | Salive et al. |
| 5,617,481 A | 4/1997 | Nakamura et al. |
| 5,627,915 A | 5/1997 | Rosser et al. |
| 5,635,694 A | 6/1997 | Tuhro |
| 5,635,697 A | 6/1997 | Shellhammer et al. |
| 5,640,202 A | 6/1997 | Kondo et al. |
| 5,642,442 A | 6/1997 | Morton et al. |
| 5,644,408 A | 7/1997 | Li et al. |
| 5,646,390 A | 7/1997 | Wang et al. |
| 5,659,167 A | 8/1997 | Wang et al. |
| 5,668,803 A | 9/1997 | Tymes et al. |
| 5,684,290 A | 11/1997 | Arackellian et al. |
| 5,691,527 A | 11/1997 | Hara et al. |
| 5,697,504 A | 12/1997 | Hiramatsu et al. |
| 5,702,059 A | 12/1997 | Chu et al. |
| 5,703,349 A | 12/1997 | Meyerson et al. |
| 5,708,680 A | 1/1998 | Gollnick et al. |
| 5,710,419 A | 1/1998 | Wang et al. |
| 5,714,745 A | 2/1998 | Ju et al. |
| 5,723,868 A | 3/1998 | Hammond, Jr. et al. |
| 5,726,981 A | 3/1998 | Ylitervo et al. |
| 5,726,984 A | 3/1998 | Kubler et al. |
| 5,734,153 A | 3/1998 | Swartz et al. |
| 5,756,981 A | 5/1998 | Roustaei et al. |
| 5,760,382 A | 6/1998 | Li et al. |
| 5,761,686 A | 6/1998 | Bloomberg |
| 5,770,841 A | 6/1998 | Moed et al. |
| 5,773,806 A | 6/1998 | Longacre, Jr. |
| 5,773,810 A | 6/1998 | Hussey et al. |
| 5,777,315 A | 7/1998 | Wilz et al. |
| 5,780,834 A | 7/1998 | Havens et al. |
| 5,783,811 A | 7/1998 | Feng et al. |
| 5,786,586 A | 7/1998 | Pidhirny et al. |
| 5,793,033 A | 8/1998 | Feng et al. |
| 5,796,090 A | 8/1998 | Pavlidis et al. |
| 5,801,371 A | 9/1998 | Kahn et al. |
| 5,804,805 A | 9/1998 | Koenck et al. |
| 5,818,028 A | 10/1998 | Meyerson et al. |
| 5,818,528 A | 10/1998 | Roth et al. |
| 5,821,518 A | 10/1998 | Sussmeier et al. |
| 5,821,523 A | 10/1998 | Bunte et al. |
| 5,825,002 A | 10/1998 | Roslak |
| 5,835,754 A | 11/1998 | Nakanishi |

(56) References Cited

U.S. PATENT DOCUMENTS

| | | |
|---|---|---|
| 5,837,986 A | 11/1998 | Barile et al. |
| 5,841,121 A | 11/1998 | Koenck |
| 5,844,227 A | 12/1998 | Schmidt et al. |
| 5,848,064 A | 12/1998 | Cowan |
| 5,857,029 A | 1/1999 | Patel |
| 5,859,828 A | 1/1999 | Ishibashi et al. |
| 5,867,595 A | 2/1999 | Cymbalski |
| 5,869,828 A | 2/1999 | Braginsky |
| 5,880,453 A | 3/1999 | Wang et al. |
| 5,886,338 A | 3/1999 | Arackellian et al. |
| 5,892,824 A | 4/1999 | Beatson et al. |
| 5,903,548 A | 5/1999 | Delamater |
| 5,914,476 A | 6/1999 | Gerst, III et al. |
| 5,917,925 A | 6/1999 | Moore |
| 5,917,945 A | 6/1999 | Cymbalski |
| 5,920,056 A | 7/1999 | Bonnet |
| 5,929,418 A | 7/1999 | Ehrhart et al. |
| 5,942,743 A | 8/1999 | Schmidt et al. |
| 5,945,661 A | 8/1999 | Nukui et al. |
| 5,949,052 A | 9/1999 | Longacre, Jr. et al. |
| 5,949,053 A | 9/1999 | Zlotnick et al. |
| 5,949,057 A | 9/1999 | Feng |
| 5,965,863 A | 10/1999 | Parker et al. |
| 5,974,202 A | 10/1999 | Wang et al. |
| 5,990,744 A | 11/1999 | Nagaraj |
| 5,992,744 A | 11/1999 | Smith et al. |
| 5,992,753 A | 11/1999 | Xu |
| 6,000,612 A | 12/1999 | Xu |
| 6,002,491 A | 12/1999 | Li et al. |
| 6,011,873 A | 1/2000 | Desai et al. |
| 6,015,088 A | 1/2000 | Parker et al. |
| 6,019,286 A | 2/2000 | Li et al. |
| 6,024,284 A | 2/2000 | Schmid et al. |
| 6,036,095 A | 3/2000 | Seo et al. |
| 6,055,552 A | 4/2000 | Curry |
| 6,060,722 A | 5/2000 | Havens et al. |
| 6,062,475 A | 5/2000 | Feng |
| 6,070,805 A | 6/2000 | Kaufman et al. |
| 6,076,731 A | 6/2000 | Terrell |
| 6,076,733 A | 6/2000 | Wilz, Sr. et al. |
| 6,076,738 A | 6/2000 | Bloomberg et al. |
| 6,081,827 A | 6/2000 | Reber et al. |
| 6,089,455 A | 7/2000 | Yagita et al. |
| 6,094,509 A | 7/2000 | Zheng et al. |
| 6,095,418 A | 8/2000 | Swartz et al. |
| 6,098,887 A | 8/2000 | Figarella et al. |
| 6,101,487 A | 8/2000 | Yeung et al. |
| 6,105,871 A | 8/2000 | Campo et al. |
| 6,108,612 A | 8/2000 | Vescovi et al. |
| 6,115,513 A | 9/2000 | Miyazaki et al. |
| 6,119,179 A | 9/2000 | Whitridge et al. |
| 6,122,410 A | 9/2000 | Zheng et al. |
| 6,123,261 A | 9/2000 | Roustaei |
| 6,129,278 A | 10/2000 | Wang et al. |
| 6,131,048 A | 10/2000 | Sudo et al. |
| 6,133,951 A | 10/2000 | Miyadera et al. |
| 6,149,063 A | 11/2000 | Reynolds et al. |
| 6,157,618 A | 12/2000 | Boss et al. |
| 6,189,796 B1 | 2/2001 | Itoh et al. |
| 6,195,122 B1 | 2/2001 | Vincent |
| 6,198,948 B1 | 3/2001 | Sudo et al. |
| 6,212,504 B1 | 4/2001 | Hayosh |
| 6,220,509 B1 | 4/2001 | Byford et al. |
| 6,223,988 B1 | 5/2001 | Batterman et al. |
| 6,243,447 B1 | 6/2001 | Swartz et al. |
| 6,269,336 B1 | 7/2001 | Ladd et al. |
| 6,283,375 B1 | 9/2001 | Wilz, Sr. et al. |
| 6,285,916 B1 | 9/2001 | Kadaba et al. |
| 6,286,760 B1 | 9/2001 | Schmidt et al. |
| 6,288,760 B1 | 9/2001 | Sawayama |
| 6,290,132 B1 | 9/2001 | Dickson et al. |
| 6,292,181 B1 | 9/2001 | Banerjee et al. |
| 6,321,989 B1 | 11/2001 | Wilz, Sr. et al. |
| 6,321,992 B1 | 11/2001 | Knowles et al. |
| 6,330,244 B1 | 12/2001 | Swartz et al. |
| 6,330,975 B1 | 12/2001 | Bunte et al. |
| 6,336,587 B1 | 1/2002 | He et al. |
| 6,338,587 B1 | 1/2002 | Kuo |
| 6,340,114 B1 | 1/2002 | Correa et al. |
| 6,347,163 B2 | 2/2002 | Roustaei |
| 6,347,743 B2 | 2/2002 | Wilz, Sr. et al. |
| 6,357,662 B1 | 3/2002 | Helton et al. |
| 6,366,771 B1 | 4/2002 | Angle et al. |
| 6,373,507 B1 | 4/2002 | Camara et al. |
| 6,375,075 B1 | 4/2002 | Ackley et al. |
| 6,384,907 B1 | 5/2002 | Gooch et al. |
| 6,389,010 B1 | 5/2002 | Kubler et al. |
| 6,398,112 B1 | 6/2002 | Li et al. |
| 6,404,764 B1 | 6/2002 | Jones et al. |
| 6,404,772 B1 | 6/2002 | Beach et al. |
| 6,418,325 B1 | 7/2002 | Reber et al. |
| 6,424,830 B1 | 7/2002 | O'Hagan et al. |
| 6,478,223 B1 | 11/2002 | Ackley |
| 6,494,375 B1 | 12/2002 | Ishibashi et al. |
| 6,507,856 B1 | 1/2003 | Chen et al. |
| 6,512,218 B1 | 1/2003 | Canini et al. |
| 6,512,541 B2 | 1/2003 | Dunton et al. |
| 6,530,523 B1 | 3/2003 | Oakeson et al. |
| 6,539,360 B1 | 3/2003 | Kadaba |
| 6,539,422 B1 | 3/2003 | Hunt et al. |
| 6,540,142 B1 | 4/2003 | Alleshouse |
| 6,556,242 B1 | 4/2003 | Dunton et al. |
| 6,568,596 B1 | 5/2003 | Shaw |
| 6,572,020 B2 | 6/2003 | Barkan |
| 6,600,734 B1 | 7/2003 | Gernert et al. |
| 6,629,642 B1 | 10/2003 | Swartz et al. |
| 6,637,658 B2 | 10/2003 | Barber et al. |
| 6,641,046 B2 | 11/2003 | Durbin |
| 6,651,060 B1 | 11/2003 | Harper et al. |
| 6,655,593 B2 | 12/2003 | Alleshouse |
| 6,678,425 B1 | 1/2004 | Flores et al. |
| 6,681,121 B1 | 1/2004 | Preston et al. |
| 6,681,994 B1 | 1/2004 | Koenck |
| 6,688,523 B1 | 2/2004 | Koenck |
| 6,694,366 B1 | 2/2004 | Gernert et al. |
| 6,697,805 B1 | 2/2004 | Choquier et al. |
| 6,722,569 B2 | 4/2004 | Ehrhart et al. |
| 6,736,322 B2 | 5/2004 | Gobburu et al. |
| 6,738,092 B1 | 5/2004 | Nakagawa et al. |
| 6,746,164 B1 | 6/2004 | Albright et al. |
| 6,758,403 B1 | 7/2004 | Keys et al. |
| 6,763,226 B1 | 7/2004 | McZeal, Jr. |
| 6,764,009 B2 | 7/2004 | Melick et al. |
| 6,772,947 B2 | 8/2004 | Shaw |
| 6,772,949 B2 | 8/2004 | Wilz, Sr. et al. |
| 6,776,342 B1 | 8/2004 | Thuries et al. |
| 6,783,069 B1 | 8/2004 | Hecht et al. |
| 6,786,069 B2 | 9/2004 | Ochi et al. |
| 6,792,452 B1 | 9/2004 | Philyaw |
| 6,811,088 B2 | 11/2004 | Lanzaro et al. |
| 6,827,273 B2 | 12/2004 | Wilz, Sr. et al. |
| 6,834,807 B2 | 12/2004 | Ehrhart et al. |
| 6,845,092 B2 | 1/2005 | Vassilovski et al. |
| 6,847,632 B1 | 1/2005 | Lee et al. |
| 6,850,510 B2 | 2/2005 | Kubler et al. |
| 6,859,134 B1 | 2/2005 | Heiman et al. |
| 6,870,827 B1 | 3/2005 | Voit et al. |
| 6,902,114 B2 | 6/2005 | Hashimoto et al. |
| 6,908,034 B2 | 6/2005 | Alleshouse |
| 6,928,289 B1 | 8/2005 | Cho et al. |
| 6,942,151 B2 | 9/2005 | Ehrhart |
| 7,111,787 B2 * | 9/2006 | Ehrhart .................... 235/472.01 |
| 7,263,699 B2 | 8/2007 | Jacquemot et al. |
| 7,287,697 B2 | 10/2007 | Ehrhart et al. |
| 7,543,747 B2 | 6/2009 | Ehrhart |
| 2001/0055422 A1 | 12/2001 | Roustaei |
| 2002/0039099 A1 | 4/2002 | Harper |
| 2002/0111924 A1 | 8/2002 | Lewis |
| 2002/0170970 A1 | 11/2002 | Ehrhart |
| 2002/0171745 A1 | 11/2002 | Ehrhart |
| 2003/0046192 A1 | 3/2003 | Eguchi et al. |
| 2003/0136841 A1 | 7/2003 | Alleshouse |
| 2003/0197062 A1 | 10/2003 | Shaw |
| 2004/0003388 A1 | 1/2004 | Jacquemot et al. |

(56) References Cited

U.S. PATENT DOCUMENTS

| | | |
|---|---|---|
| 2004/0149826 A1 | 8/2004 | Alleshouse |
| 2004/0155110 A1 | 8/2004 | Ehrhart et al. |
| 2005/0008263 A1 | 1/2005 | Nagahashi et al. |
| 2007/0051814 A1 | 3/2007 | Ehrhart et al. |

FOREIGN PATENT DOCUMENTS

| | | |
|---|---|---|
| EP | 0439682 A2 | 8/1991 |
| EP | 0733991 A2 | 9/1996 |
| EP | 0910032 A2 | 4/1999 |
| EP | 0998147 A1 | 5/2000 |
| EP | 0999514 A1 | 5/2000 |
| JP | 63311474 | 12/1988 |
| JP | 1216486 | 8/1989 |
| JP | 03020058 | 1/1991 |
| JP | 4257844 | 9/1992 |
| JP | 05054152 | 3/1993 |
| JP | 6250775 | 9/1994 |
| JP | 10224773 | 8/1998 |
| WO | WO9202371 A1 | 2/1992 |
| WO | WO9217861 A1 | 10/1992 |
| WO | WO9513196 A1 | 5/1995 |
| WO | WO9524278 A1 | 9/1995 |
| WO | WO9534043 A1 | 12/1995 |
| WO | WO9639676 A1 | 12/1996 |
| WO | WO9708647 A1 | 3/1997 |
| WO | WO9950736 A1 | 10/1999 |
| WO | WO0072246 A1 | 11/2000 |
| WO | WO0122358 A1 | 3/2001 |
| WO | WO02080520 A2 | 10/2002 |

OTHER PUBLICATIONS

International Search Report for International Patent Application No. PCT/US02/15095 dated Feb. 12, 2002.

Report Summarizing references of record on U.S. Appl. No. 09/858,163, filed May 25, 2001.

Notice for Grounds of Rejection, Japanese Patent Application No. 2002-590059. Dated Oct. 28, 2008. 2 pages and 3 pages which are the English translation of the Grounds for Rejection.

* cited by examiner

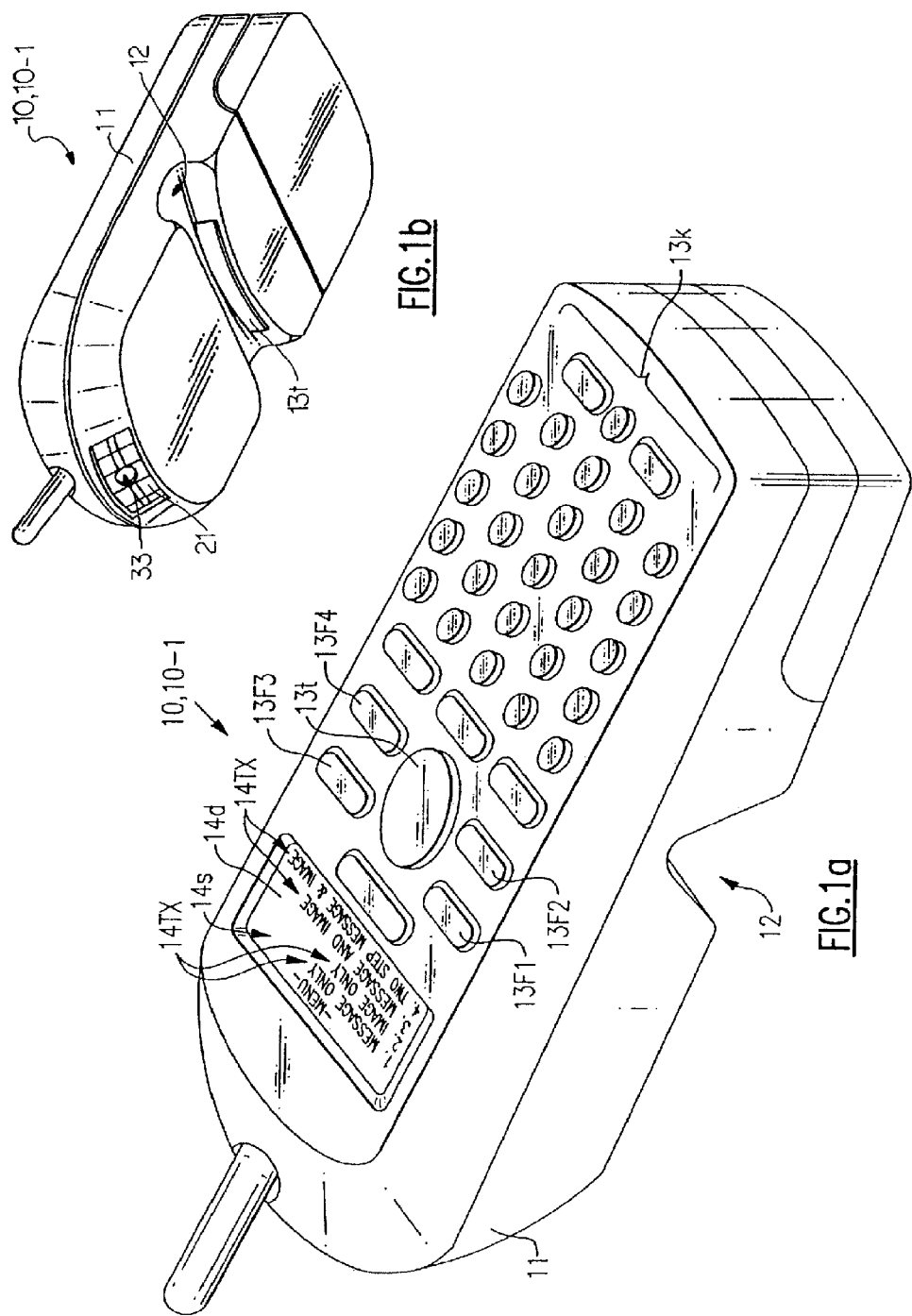

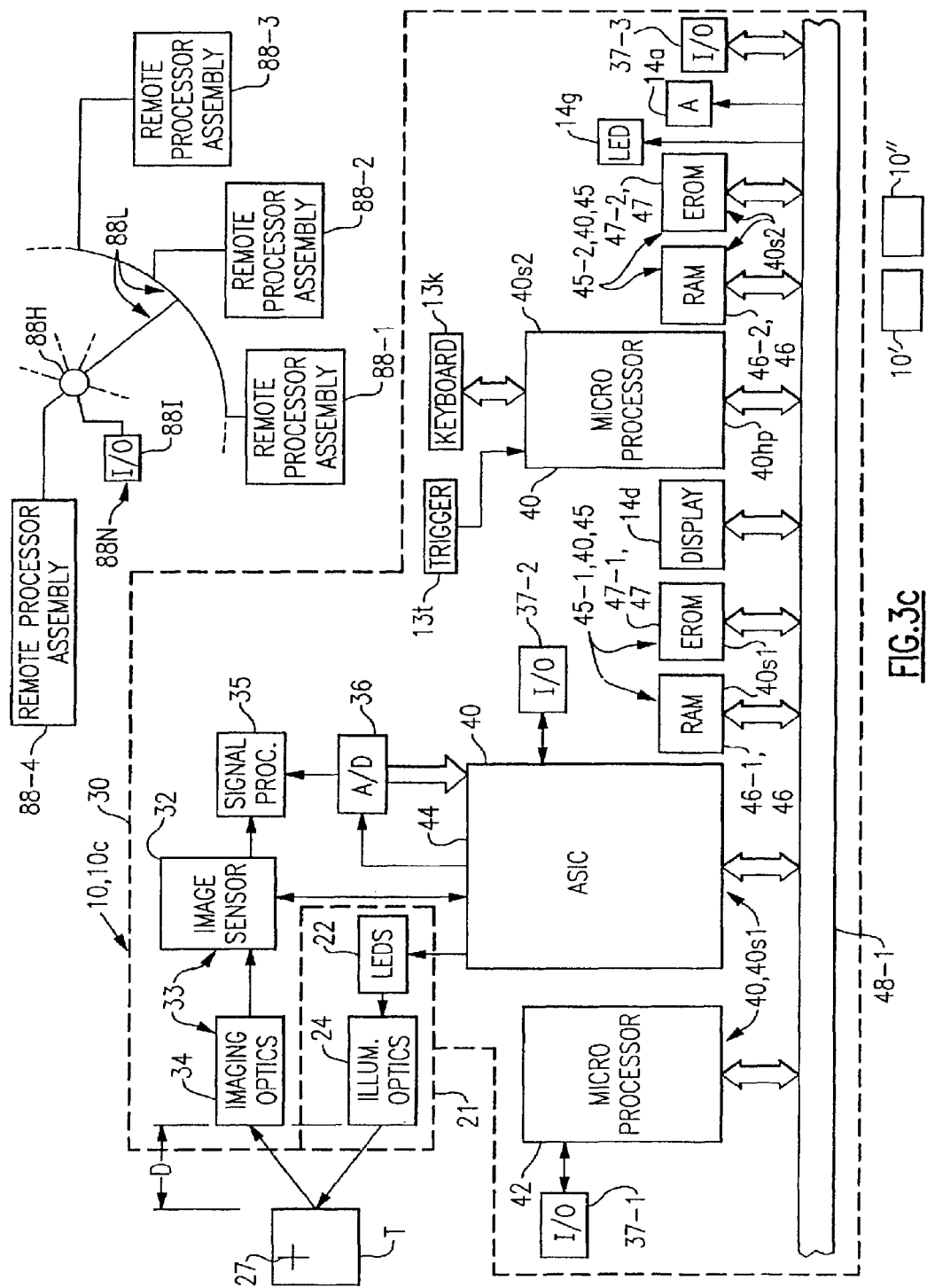

IMAGE CAPTURE APPARATUS AND METHOD

CROSS REFERENCE TO RELATED APPLICATIONS

This application is a divisional of U.S. patent application Ser. No. 12/480,474, filed Jun. 8, 2009, which is a divisional of U.S. patent application Ser. No. 11/442,662, filed May 25, 2006 (now U.S. Pat. No. 7,543,747), which is a divisional of U.S. patent application Ser. No. 09/858,163, filed on May 15, 2001 (now U.S. Pat. No. 7,111,787). This application is also related to U.S. patent application Ser. No. 10/143,158 (now U.S. Pat. No. 6,942,151). Each of the above applications is incorporated herein by reference in its entirety.

FIELD OF THE INVENTION

The invention relates to an image capture apparatus and method.

BACKGROUND OF THE INVENTION

Currently available image sensor based optical readers include circuitry which (1) captures a frame image data into a decoding buffer memory location, (2) attempts to decode a bar code symbol or OCR decodable text message represented in the frame image data, and which (3) outputs a decoded-out message corresponding to a decodable indicia represented in the frame of image data.

In these readers there is no further attempt to decode a message encoded in symbol or text characters represented in the frame of image data. When decoding fails using such a device, the reader captures another frame of image data, attempts to decode it, and continues capturing frames of image data and attempting to decode image data until a trigger of the reader is released or until a symbol is successfully decoded. If the symbol or text string is otherwise decodable but the reader is not configured to read the symbol or OCR text string in the field of view of the reader, another optical reader must be utilized to decode the decodable symbol or text string. Decodable symbols and decodable text characters are referred to generically herein as "decodable indicia."

Another problem noted with use of optical readers is fraud. Bar code symbols are now used for identifying a wide range of products and other items including retail items, shipping containers, U.S. patents and personal identification cards. The increased use of bar code symbols and decodable text characters has made decodable symbol and text characters the target of fraud perpetrators. A common fraud scheme perpetrated in connection with decodable indicia is transposition. In a transposition fraud scheme a decodable indicia is taken from one item (such as a retail product of lower value) and transposed on another item (such as an item of higher value). Unfortunately, presently available optical readers are not equipped to detect when such transposition fraud schemes have taken place. Especially in environments where the decoding of symbols and text characters is highly automated, transposition and other fraud schemes related to bar code use go undetected.

There is a need for an optical reader which is better equipped to read obscure or otherwise hard to read symbols or text characters and which is better equipped for detecting fraud.

DETAILED DESCRIPTION OF THE DRAWINGS

The preferred embodiment of the invention will now be described, by way of example only, with reference to the accompanying figures wherein like members bear like reference numerals and wherein:

FIGS. 1a-1b show a reader according to the invention;

FIGS. 3a-3e show alternative electronic hardware for optical readers and reader communication systems for the invention;

DETAILED DESCRIPTION OF THE INVENTION

Figure 2A:
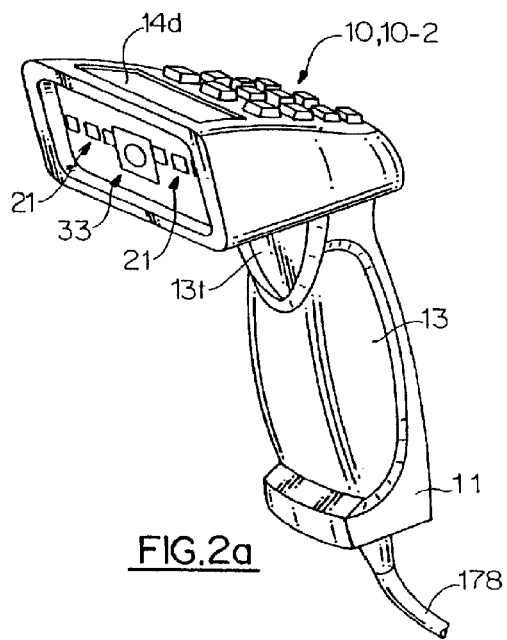
FIGS. 2a-2d show alternative embodiments of optical reading imaging devices in which the invention may be incorporated.

There is provided an optical reading imaging device which is highly useful for reading obscure or hard to read symbols or OCR decodable text characters, which is highly useful for detecting fraud, and which is also highly useful for creating an easily searchable database of indexed image files.

Preferably, a reader according to the invention is in communication with or operating under the control of a powerful processor system or a network of powerful processor systems.

A reader according to the invention in one embodiment is operable in four user-selected modes of operation. The modes may be selected from a decoding option menu driver which is called-up by selecting a decoding function of the optical reading device, from a set of possible device functions. The decode function may be selected from a function menu driver which is made available to a user when a reader according to the invention is first powered up.

The user selectable modes of operation are: (1) "message only;" (2) "image only," (3) "message and image," and (4) "two-step message and image."

In the first user selectable mode of operation, the "message only" mode, a reader according to the invention operates in accordance with the operation of a reader of the prior art discussed in the background herein. That is, when the first user-selected decoding mode of operation is selected, the reader captures a frame of image data into a decoding buffer memory location, attempts to decode any decodable indicia in the captured frame, and stores the decoded message in a memory location dedicated for storing the message information without storing into a designated frame storage memory location the frame of image data from which the decoded message was decoded.

When operating in the second user-selected decoding mode of operation, the "image only" mode, a reader according to the invention stores a frame of image data in a designated frame storage memory location where it is made available for transmitting to another memory location. It may be desirable to transfer the frame of image data to another memory location, for example, so that the image data can be subjected to bar code or OCR decoding operation a processor system other than the one responsible for the original image capture. The second mode of operation is highly useful in decoding environments where it is known that the decodable indicia is decodable but is of a type that cannot be decoded by the reader capturing the frame including the indicia as presently configured. For example, the reader reading the indicia may be capable of symbol decoding only whereas the decodable indicia of a capture image may comprise OCR characters. The second mode also conveniently allows a user to capture an image for any purpose which may be unrelated to decoding during the course of operating reader 10 in accordance with a decoding function of reader 10.

When operating in the third user-selected mode of operation, the "message and image" mode, a reader according to the invention stores to a designated frame storage memory location a frame of image data and stores to the same and/or another memory location a decoded message corresponding to the decodable indicia represented in the image.

In a fourth mode, the "two-step message and image mode", a reader according to the invention may store into a designated frame storage memory location both a frame of image data and a decoded message associated with the frame of image data as in the third mode. However, in the fourth mode, the decoded message is not decoded from a decodable indicia represented in the stored frame of image data. A user captures two separate images during the course of operating the reader in the fourth mode. One of the captured images is stored in a dedicated memory space and the other of the captured images is subjected to decoding for developing a decoded-out message which is associated with the memory stored captured image.

In both the third and fourth modes, message data is associated with image data. The message data can be associated with image data in a number of different ways. For example, the reader may convert the decoded-out message into an image representation of the characters of the message data, and stitch the image representation of the message into a section of the frame of stored image data. The message data may also be stored in a memory location separate from the frame storage memory location, where it is retained as message data and not converted to image data. The message data may also be stored in a header byte location of a header associated with the image file encoding the stored frame of image data.

The third and fourth modes are highly useful for fraud detection. That is, by selecting the third or fourth modes a user has the capacity to view an image side-by-side to a decoded-out message-image. If the image comprises a representation of a package or item on which the bar code is located, a user can determine if the bar code or package have been tampered with by viewing the image in connection with the decoded message.

The third and fourth modes are also highly useful for providing secondary decoding functions. The message associated with an image in the third or fourth modes is decoded from a decodable indicia in or associated with the scene corresponding to the stored frame of image data. However, the scene represented by the stored frame of image data may include additional decodable indicia which was not subjected to decoding or of a type that could not be decoded by the as-configured reader at the time the reader captured the frame of image data stored in designated image frame storage location. The third and fourth modes allow this secondary decodable indicia to be decoded at a later time, after decoding of the indicia yielding the decoded-out message stored in a designated memory location during the third or fourth modes.

Still further, the third and fourth modes are highly useful for image indexing applications. Incorporating message data in a specific header location of several memory stored image data frame image files creates a database of image files, wherein each image file is indexed by the message associated with the image, as determined by the decodable indicia yielding the decoded-out message. When such a database is created, any one image file in the database can be accessed by searching for a particular decoded-out message in the particular header byte location of the various image data frame image files.

The invention is first described briefly with reference to FIGS. 1*a* and 1*b* showing top and bottom perspective views of an optical reader 10, 10-1 having an imaging assembly 33, incorporated therein. A reader according to the invention is operable in one embodiment in four modes of operation: (1) a "message only" mode, (2) an "image only" mode (3) a "message and image mode", and (4) a "two-step message and image mode." In one embodiment, a menu driver prompting a user to select one of the four modes is accessed by selecting a decoding option of the imaging device in which the invention is incorporated, out of a set of possible device functions.

In the "message only" mode, reader 10 stores to a designated memory location a decoded-out data message. In an "image only" mode, a reader according to the invention, stores to a designated frame storage memory location a frame of image data without attempting to decode decoded indicia represented in the image. In a "message and image" mode, a reader according to the invention stores to a designated memory location a frame of image data and, in addition, a decoded-out message associated with the frame of image data to the frame storage memory location and or to another designated memory location. In the two-step message and image mode, a reader according to the invention stores into a designated memory location or locations both a frame of image data and a decoded-out message associated with the frame of image data as in the third mode. However, in the fourth mode, the decoded message is not decoded from a decodable indicia represented in the stored frame of image data. A user captures two separate images during the course of operating the reader in the fourth mode. One of the captured images is stored in a dedicated memory space and the other of the captured images is subjected to decoding for developing a decoded message which is then associated with the memory stored captured image.

Figure 2B:
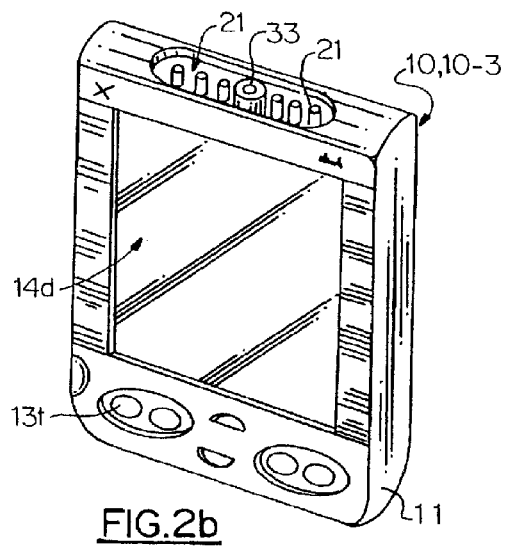
Figure 2C:
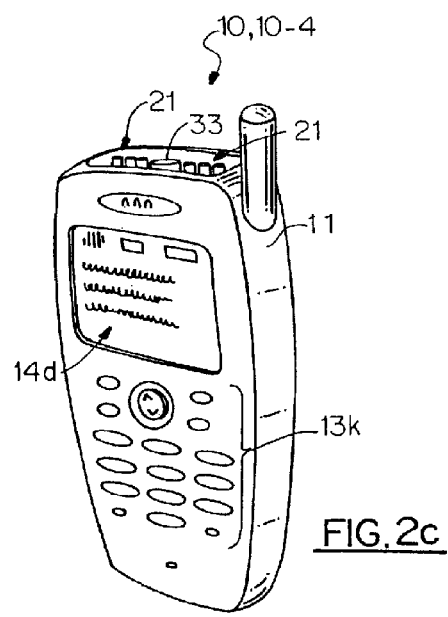
Figure 2D:
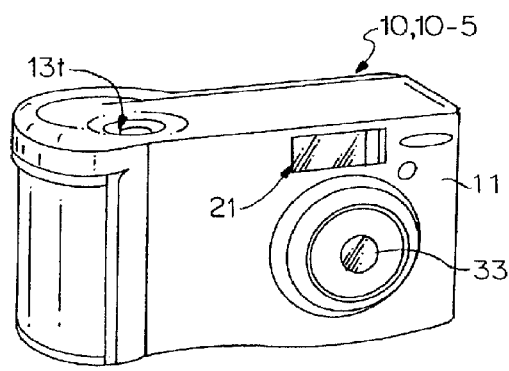

Shown in the embodiment of FIGS. 1*a* and 1*b* as being provided by a keyboard equipped data collection device having a finger saddle 12, reader 10 may take on a variety of forms. For example, the invention can be incorporated in a traditionally styled optical reader 10, 10-2 having a handle 13, as indicated in the embodiment of FIG. 2*a*, or a palm-held personal computer, or personal data assistant (PDA) 10, 10-3 indicated in the example of FIG. 2*b*. The invention can also be incorporated in a wireless portable telephone 10, 10-4 as indicated by the example of FIG. 2*c* or in a digital camera 10, 10-5 as indicated by FIG. 2*d*. All of the above readers 10-1, 10-2, 10-3, 10-4, and 10-5 have incorporated therein an imaging apparatus 33 which includes at least imaging optics, and an image sensing device. The above readers also include an illumination assembly 21 for illuminating a target area, T.

In the embodiments of FIGS. 1*a*-2*c* illumination assembly 21 typically comprises LEDs. Illumination system assembly 21 of the digital camera 10-4 of FIG. 2*d* typically comprises a flash illuminator. All of the above readers 10-1, 10-2, 10-3, 10-4 and 10-5 also comprise a hand-held portable housing 11.

As is indicated in the specific embodiment of FIG. 1*a*, optical reader 10 includes a keyboard 13*k* and a display 14*d*.

Reader 10, 10-1, may prompt a user to select one of the three modes by displaying a menu as shown by screen display 14s, having text section 14tx corresponding to each of the modes.

Reader 10-1 may be equipped with a graphical user interface for aiding in the menu selection of one of the four operational modes. While the menu driver in the embodiment of FIG. 1a is shown as being a display-aided menu driver in which indicators 14TX corresponding to each of the menu choices is displayed, it will be understood that the menu driver of the invention can take on a variety of forms. For example, turning to the example of FIG. 2d, the menu driver of digital camera reader 10-5 is conveniently embodied by a toggling menu driver menu system wherein depressing of an available control buttons of reader 10-5 toggles through several menu options, causing a different indicia to appear in a viewfinder display inside camera 10-5 each time the control button is toggled. The menu driver system soliciting selection of one of the modes described herein may also comprise a series of keys on a keyboard, wherein each of the various keys is configured so that selection of one of the keys results in one particular mode being selected. In the embodiment of FIG. 1a for example, reader 10-1 may have four function keys, 13F1, 13F2, 13F3, 13F4, each one corresponding to one of the available operating modes. In an embodiment wherein a reader according to the invention comprises neither control buttons nor a display, a menu driver of the invention is conveniently provided by a series of menu symbols to be described later herein. Preferably, an operation menu driver which displays indicia corresponding to the operational modes is made available to a user of reader 10 after the user selects, using a reader function menu driver, a "decoding" function from a set of alternative functions, such as a "camera" function, or a "file transfer" function, and a "reprogramming" function.

The availability of multiple operational modes of the reader described herein allows the operation of the reader to be optimized depending on the particular decoding environment. In case the snappiest of operations is desired, and the expected indicia to be decoded is common and readily decoded, and there is little likelihood of fraudulent bar code use, then the first mode is commonly selected. In the case that a captured symbol representation includes a decodable indicia but the reader as presently configured is not configured to read the symbol, it is desirable to select the second mode. The third and fourth modes are highly useful wherein a scene includes at least one decodable indicia that can be configured by the image capturing reader as presently configured, but also comprises other decodable indicia which cannot be decoded by the reader 10 as presently configured.

The third and forth modes are also highly useful in the case there is a substantial likelihood of indicia transposition fraud. Still further, the third and fourth modes are also highly useful in the case it is desired to file several images in an easily searchable indexed database of stored image files.

Figure 3A:
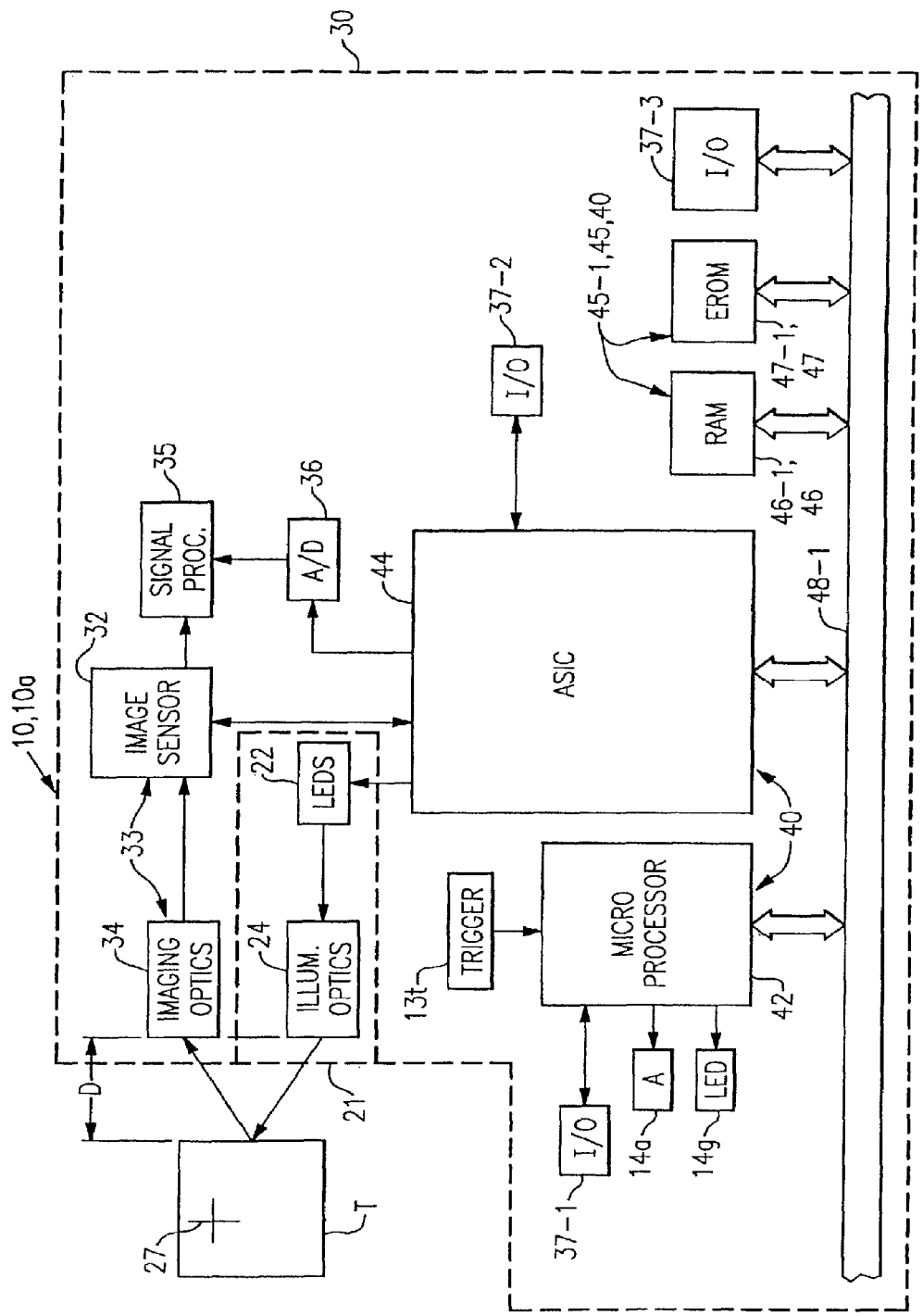

Block diagrams illustrating various types of electronic hardware configurations for optical readers in which the invention may be incorporated and communication systems comprising at least one optical reader are shown in FIGS. 3a-3e. Referring to FIG. 3a, optical reader 10a includes a reader processor assembly 30.

Reader processor assembly 30, includes an illumination assembly 21 for illuminating a target object T, such as a substrate bearing 1D or 2D bar code symbol or a text string, and an imaging assembly 33 for receiving an image of object T and generating an electrical output signal indicative of the data optically encoded therein. Illumination assembly 21 may, for example, include an illumination source assembly 22, together with an illuminating optics assembly 24, such as one or more lenses, diffusers, wedges, reflectors or a combination of such elements, for directing light from light source 22 in the direction of a target object T. Illumination assembly 21 may comprise, for example, laser or light emitting diodes (LEDs) such as white LEDs or red LEDs. Illumination assembly 21 may include target illumination and optics for projecting an aiming pattern on target T. Illumination assembly 21 may be eliminated if ambient light levels are certain to be high enough to allow high quality images of object T to be taken. Illumination assembly 21 may also be located remote from reader housing 11, at a location so as to eliminate or reduce specular reflections. Imaging assembly 33 may include an image sensor 32, such as a color or monochrome 1D or 2D CCD, CMOS, NMOS, PMOS, CID or CMD solid state image sensor, together with an imaging optics assembly 34 for receiving and focusing an image of object T onto image sensor 32. The array-based imaging assembly shown in FIG. 3a may be replaced by a laser array based imaging assembly comprising one or more laser sources, a scanning mechanism, emit and receive optics, at least one photodetector and accompanying signal processing circuitry.

Reader processor assembly 30 of the embodiment of FIG. 3a also includes programmable control circuit 40 which preferably comprises an integrated circuit microprocessor 42 and an application specific integrated circuit (ASIC 44). The function of ASIC 44 could also be provided by field programmable gate array (FPGA). Processor 42 and ASIC 44 are both programmable control devices which are able to receive, output and process data in accordance with a stored program stored in memory unit 45 which may comprise such memory elements as a read/write random access memory or RAM 46, 46-1 and an erasable read only memory or EROM 47, 47-1. RAM 46, 46-1 typically includes at least one volatile memory device but may include one or more long term non-volatile memory devices. Processor 42 and ASIC 44 are also both connected to a common bus 48-1 through which program data and working data, including address data, may be received and transmitted in either direction to any circuitry that is also connected thereto. Processor 42 and ASIC 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding decodable image data such as symbology or text character data stored in RAM 46, 46-1 in accordance with program data stored in EROM 47, 47-1. ASIC 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processor 42 and ASIC 44 will naturally depend on the type of off-the-shelf microprocessors that are available, the type of image sensor which is used, the rate at which image data is output by imaging assembly 33, etc. There is nothing in principle, however, that requires that any particular division of labor be made between processors 42 and 44, or even that such a division be made at all.

With processor architectures of the type shown in FIG. 3a, a typical division of labor between processor 42 and ASIC 44 will be as follows. Processor 42 is preferably devoted primarily to such tasks as decoding image data in response to trigger 13t being activated, once such data has been stored in RAM 46, 46-1 and, recognizing characters represented in stored image data according to an optical character recognition (OCR) scheme in response to an actuation of trigger 13t.

ASIC 44 is preferably devoted primarily to controlling the image acquisition process, the A/D conversion process and the storage of image data, including the ability to access memories 46-1 and 47-1 via a DMA channel. ASIC 44 may also perform many timing and communication operations. ASIC 44 may, for example, control the illumination of LEDs 22, the timing of image sensor 32 and an analog-to-digital (A/D) converter 36-1, the transmission and reception of data to and from a processor system external to assembly 30, through an RS-232, a network such as an Ethernet, a serial bus such as USB, a wireless communication link (or other) compatible I/O interface as is indicated by interface 37-2. ASIC 44 may also control the outputting of user perceptible data via an output device, such as aural output device 14a, a good read LED 14g and/or a display monitor which may be provided by a liquid crystal display such as display 14d. Control of output, display and I/O functions may also be shared between processors 42 and 44, as suggested by bus driver I/O interface 37-3 or duplicated, as suggested by microprocessor serial I/O interface 37-1 and interface 37-2. As explained earlier, the specifics of this division of labor is of no significance to the present invention.

Figure 3B:
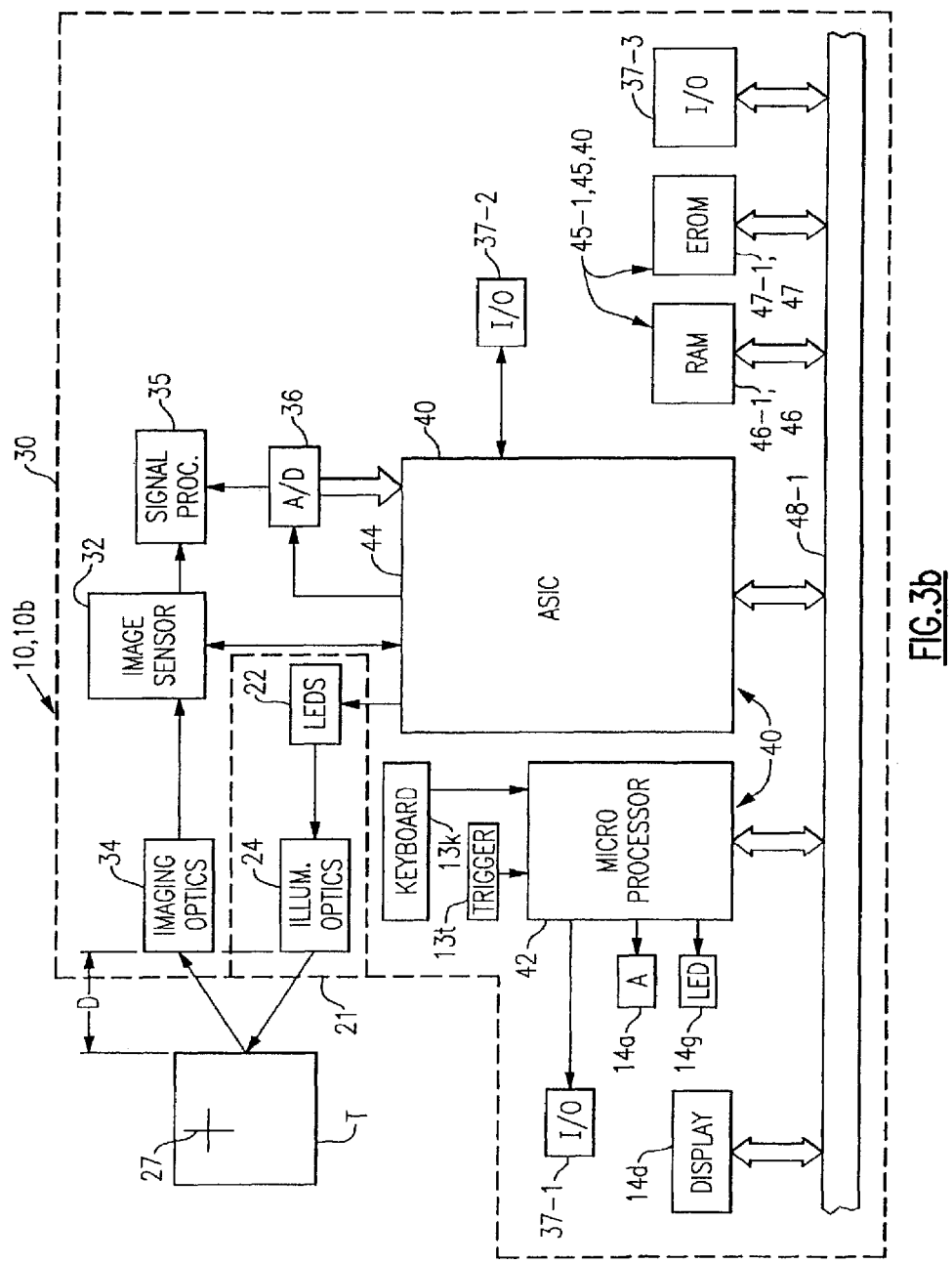

FIG. 3b shows a block diagram exemplary of an optical reader which is adapted to easily receive user-input control instructions resulting in a change in an operating program of a reader. In addition to having the elements of single state reader circuit of FIG. 3a, reader 10b includes a keyboard 13k for inputting data including instructional data and a display 14d for displaying text and/or graphical information to an operator. Keyboard 13k may be connected to bus 48-1, ASIC 44 or to processor 42 as indicated in FIG. 2b. Display 14d may be connected to ASIC 44, to processor 42 or to system bus 48-1 as is indicated in the particular embodiment of FIG. 3b.

An operator operating optical reader 10b can reprogram reader 10b in a variety of different ways. In one method for reprogramming reader 10b, an operator actuates a control button of keyboard 13k which has been pre-configured to result in the reprogramming of reader 10b. In another method for reprogramming reader 10b an operator actuates control of a processor system not integral with reader 10b to transmit an instruction to reprogram reader 10b. According to another method for reprogramming reader 10b, an operator moves reader 10b so that a "menu symbol" is in the field of view of image sensor 32 and then activates trigger 13t of reader 10b to capture an image representation of the menu symbol. A menu symbol is a specially designed bar code symbol which, when read by an appropriately configured optical reader results in a reader being programmed. The reprogramming of an optical reader with use of a menu symbol is described in detail in commonly assigned U.S. Pat. No. 5,965,863 incorporated herein by reference. Because the second and third of the above methodologies do not require actuation of a reader control button of keyboard 13k but nevertheless result in a reader being reprogrammed, it is seen that reader 10 may be keyboardless but nevertheless reprogrammable. It will be seen that the second or third of the above methodologies can be adapted for selecting one of the reader operating modes described herein.

Figure 4A:
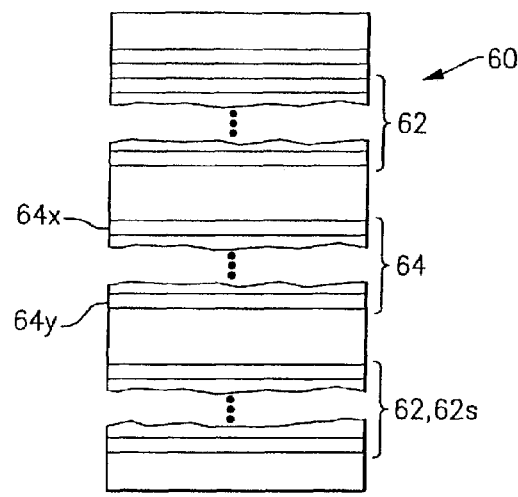
FIG. 4a shows architecture for a program memory of an optical reader according to the invention.

A typical software architecture for an application operating program typically executed by an optical reader as shown in FIG. 3b is shown in FIG. 4a depicting a memory map of a program stored in program memory 47-1. Application operating program 60 adapts a reader for a particular application. Three major applications or functions for an optical reader imaging device having image capture capability are: (1) comprehensive decoding; (2) data transfer; and (3) signature capture. In a comprehensive decoding application, reader 10 may preliminarily analyze and then decode a message corresponding to a bar code symbol or OCR decodable text character. In a data transfer application, reader 10 uploads character text files or image files to a processor system located externally relative to reader housing 11. In a signature capture application, reader 10 may capture an image corresponding to a scene having a signature, parse out from the image data that image data corresponding to a signature, and transmit the captured signature data to another processing system. It is seen that the third of such applications can be carried out by an optical reader imaging device that is not an optical reader decoder equipped with decoding capability. Numerous other application operating programs are, of course possible, including a specialized 1D decoding application, a specialized 2D bar code decoding algorithm, a specialized OCR decoding application which operates to decode OCR decodable text characters, but not bar code symbols. A user of a reader configured in accordance with the invention accesses a mode selector menu driver as exemplified by the embodiment of shown in FIG. 1a when a decoding function of the reader is actuated.

Referring now to specific aspects of the software architecture of an operating program 60, program 60 includes an instruction section 62, and a parameter section 64. Further, instruction section 62 may include selectable routine section 62s. Instructions of instruction section 62 control the overall flow of operations of reader 10. Some instructions of instruction section 62 reference a parameter from a parameter table of parameter section 64. An instruction of instruction section 62 may state in pseudocode, for example, "set illumination to level determined by [value in parameter row x]." When executing such an instruction of instruction section 62, control circuit 40 may read the value of parameter row 64x. An instruction of instruction section 62 may also cause to be executed a selectable routine that is selected depending on the status of a parameter value of parameter section 64. For example, if the application program is a bar code decoding algorithm then an instruction of instruction section 62 may state in pseudocode, for example, "launch Maxicode decoding if Maxicode parameter of parameter row 64y is set to "on". When executing such an instruction, control circuit 40 polls the contents of row 64y of parameter section 64 to determine whether to execute the routine called for by the instruction. If the parameter value indicates that the selectable routine is activated, control circuit 40, executes the appropriate instructions of routine instruction section 62s to execute the instruction routine.

It is seen, therefore, that the above described software architecture facilitates simplified reprogramming of reader 10. Reader 10 can be reprogrammed simply by changing a parameter of parameter section 64 of program 60, without changing the subroutine instruction section 62s or any other code of the instruction section 62 simply by changing a parameter of parameter section 64. The parameter of a parameter value of section 62 can be changed by appropriate user control entered via keyboard 13k, by reading a menu symbol configured to result in a change in parameter section 64, or by downloading a new parameter value or table via a processor system other than system 40 as shown in FIGS. 3a and 3b. The reprogramming of reader 10b can of course also be accomplished by downloading an entire operating program including sections 62 and 64 from a processor system other than system as shown in FIGS. 3a and 3b.

Another architecture typical of an optical reader which may be configured in accordance with the invention is shown in FIG. 3c. Reader 10c comprises a control circuit 40 having a processor system 40s1, and an integrated host processor system 40s2 which includes host processor 40hp and an associated memory 45-2. "Host processor system" herein shall refer to any processor system which stores a reader application operating program for transmission into a processor system controlling operation of a reader imaging system 33 or which exercises supervisory control over a processor system controlling operation of a reader imaging system 33, or which stores in it's associated memory more than one application operating program that is immediately executable on reception of a command of a user. In a reader having two processors such as processor 42 and processor 40hp, processor 42 is typically dedicated to processing image data to decode decodable indicia, whereas processor 40hp is devoted to instructing processor 42 to execute decoding operations, receiving inputs from trigger 13t and keyboard 13k, coordinating display and other types of output by output devices 14d, 14g, and 14a and controlling transmissions of data between various processor systems.

In architectures shown in FIG. 3c having dedicated decoding processor system 40s1 and a powerful, supervisory host processor system 40s2, host processor system 40s2 commonly has stored thereon an operating system, such as DOS WINDOWS or WINDOWS, or an operating system specially tailored for portable devices such as, WINDOWS CE available from Microsoft, Inc. In the case that host processor system 40s2 includes an operating system such as DOS or WINDOWS CE, the instruction section and parameter section of the operating program controlling the operation of host processor system 40s2 normally are programmed in a high level programming language and assembled by an assembler before being stored in memory 47-2 and therefore may not reside in consecutive address locations as suggested by program 60 shown in FIG. 4a. Nevertheless, host processor system 40s2 having an operating system integrated thereon can readily assemble an operating program into such a form for loading into an external processor system that does not have an operating system stored thereon.

Referring to further aspects of readers 10a, 10b, and 10c at least one I/O interface e.g. interface 37-1, 37-2, and 37-3 facilitates local "wired" digital communication such as RS-232, Ethernet, serial bus including Universal Serial Bus (USB), or local wireless communication technology including "Bluetooth" communication technology. At least one I/O interface, e.g. interface 37-3, meanwhile, facilitates digital communication with remote processor assembly 88-1 in one of available remote communication technologies including dial-up, ISDN, DSL, cellular or other RF, and cable. Remote processor assembly 88-1 may be part of a network 88N of processor systems as suggested by assemblies 88-2, 88-3, and 88-4 links 88L and hub 88H e.g. a personal computer or main frame computer connected to a network, or a computer that is in communication with reader 10c only and is not part of a network. The network 88N to which assembly 88-1 belongs may be part of the internet. Further, assembly 88-1 may be a server of the network and may incorporate web pages for viewing by the remaining processor assemblies of the network. In addition to being in communication with reader 10c, assembly 88-1 may be in communication with a plurality of additional readers 10' and 10". Reader 10c may be part of a local area network (LAN). Reader 10 may communicate with system 88-1 via an I/O interface associated with system 88-1 or via an I/O interface 881 of network 88N such as a bridge or router. Further, a processor system external to processor system 40 such as processor system 70s may be included in the communication link between reader 10 and assembly 88-1.

While the components of readers 10a, 10b, and 10c are represented in FIGS. 3a-3c as discreet elements it is understood that integration technologies have made it possible to form numerous circuit components on a single integrated circuit chip. For example, with present fabrication technologies, it is common to form components such as components 42, 40, 46-1, 47-1, 37-2, and 37-1 on a single piece of silicone.

Furthermore, the number of processors of reader 10 is normally of no fundamental significance to the present invention. In fact if processor 42 is made fast enough and powerful enough special purpose ASIC processor 44 can be eliminated. Likewise referring to reader 10c a single fast and powerful processor can be provided to carry out all of the functions contemplated by processors 40hp, 42, and 44 as is indicated by the architecture of reader 10e of FIG. 3e. Still further, it is understood that if reader 10 includes multiple processors the processors may communicate via parallel data transfers rather than via the serial communication protocol indicated by serial buses 48-1 and 48-2. In addition, there is no requirement of a one-to-one correspondence between processors and memory. Processors 42 and 40hp shown in FIG. 3c could share the same memory, e.g. memory 45-1. A single memory e.g. memory 45-1 may service multiple processors e.g. processor 42 and processor 40 hp.

Figure 3D:
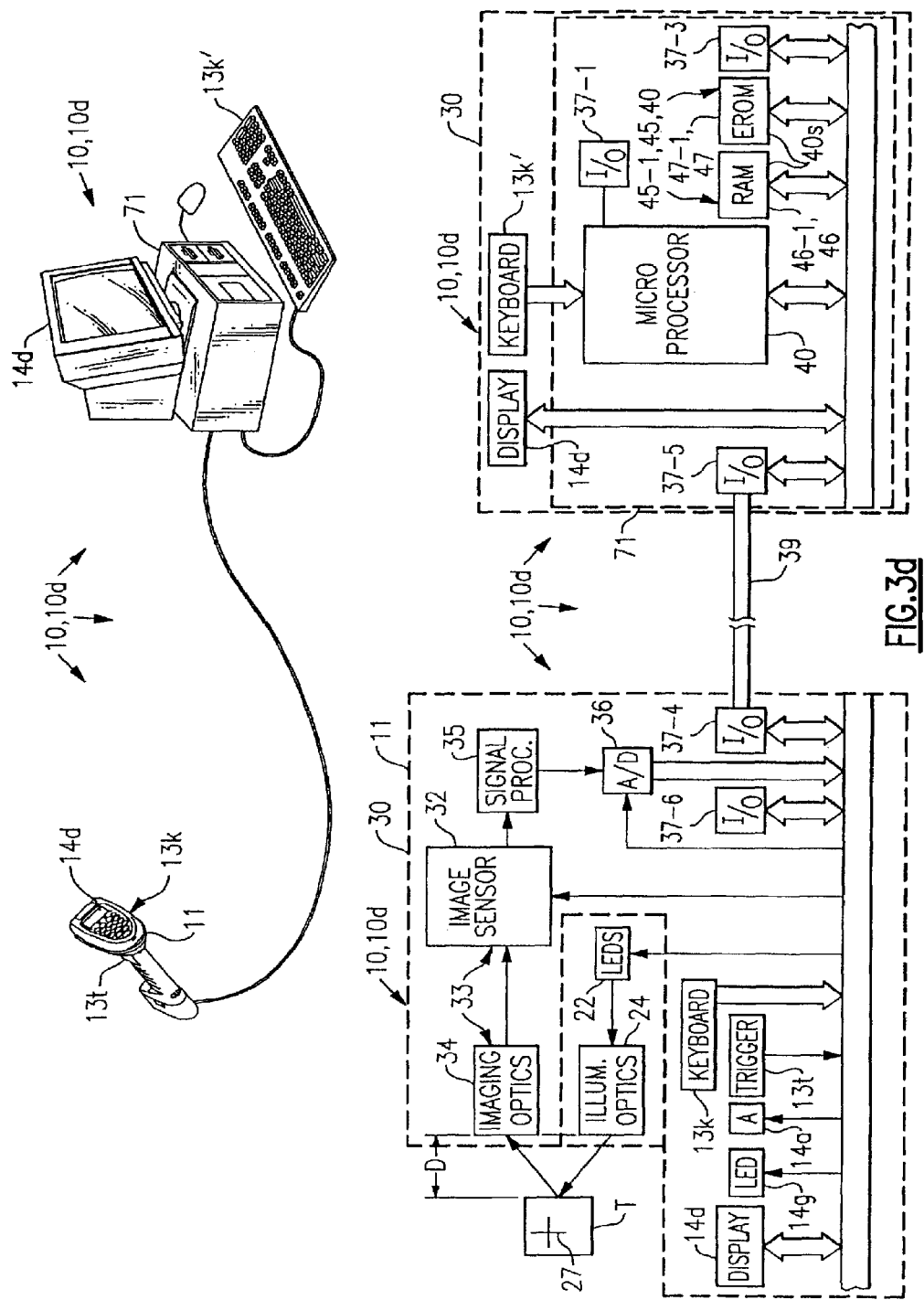

Referring to the embodiment of FIG. 3d, it is seen that it is not necessary that the entirety of electrical components of an optical reader 10 be incorporated in a portable device housing 11. The electrical components of reader 10d are spread out over more than one circuit board that are incorporated into separate device housings 11 and 71. It is understood that circuitry could be spread out into additional housings. Control circuit 40 in the embodiment of FIG. 3d is incorporated entirely in the housing 71 that is non-integral with portable device housing 11. Housing 71 is shown as being provided by a personal computer housing, but could also be provided by another type of housing such as a cash register housing, a transaction terminal housing or a housing of another portable device such as housing 11. At least one operating program for controlling imaging assembly 33 and for processing image signals generated from imaging assembly 33 is stored in EROM 47-1 located within PC housing 71. For facilitating processing of signals generated from imaging assembly 33 by a processor system that is not integrated into portable housing 11 a high speed data communication link should be established between imaging assembly 33 and processor system 40. In the embodiment of FIG. 3d, I/O interfaces 37-4 and 37-5 and communication link 39 may be configured to operate according to the USB data communication protocol. The configuration shown in FIG. 3d reduces the cost, weight, and size requirements of the portable components of reader 10d, which in reader 10-4 are the components housed within portable housing 11. Because the configuration of FIG. 3d results in fewer components being incorporated in the portable section 11 of reader 10d that are susceptible to damage, the configuration enhances the durability of the portable section of reader 10-4 delimited by housing 11.

The control circuit 40 as shown in the embodiment of FIG. 3d can be in communication with more than one "shell" processorless reader comprising a reader housing and a reader circuitry shown by the circuitry within dashed housing border 11 of FIG. 3d. In the case that a control circuit as shown in FIG. 3d services many "shell" readers or processor-equipped readers input/output port 37-5 should be equipped with multiplexing functionality to service the required data communications between several readers or shell readers and a single processors system.

Figure 3E:
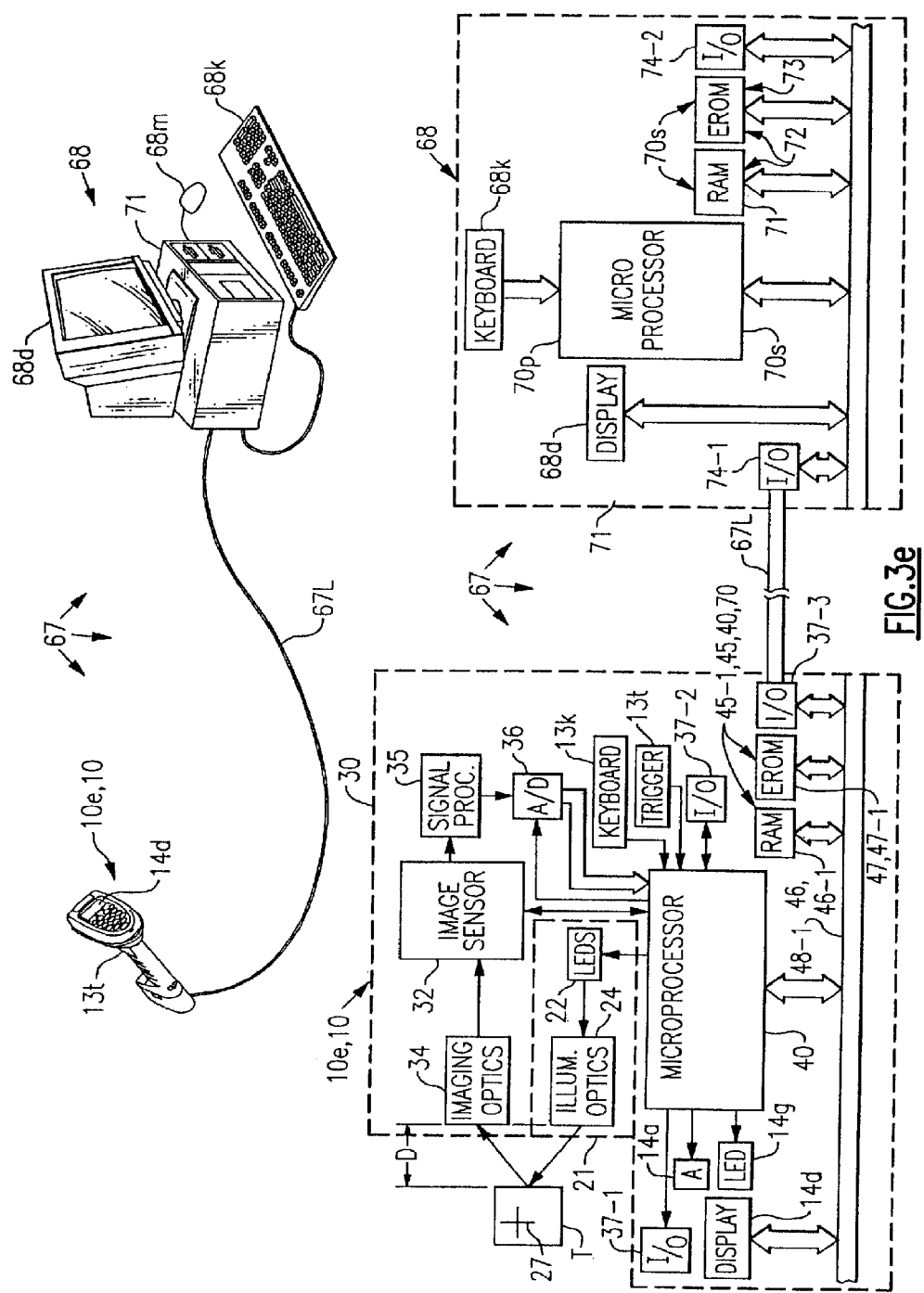

The reader communication system of FIG. 3e has a physical layout identical to reader 10d, but is optimized for a different operation. System 67 is a communication system in which reader processor system 40 communicates with a nonintegrated local host processor system 70s provided by a personal computer 68 having a PC housing 71, a keyboard 68k, a mouse 68m, and a display 68d. Provided that link 67L is a high speed communication link, nonintegrated local host processor system 70s could be programmed to provide functioning identical to processor system 40s of reader 10d. However, because reader 10e comprises an integrated processor system 40 such programming is normally unnecessary, although as described in copending application Ser. No. 09/385,597 it is useful to configure processor system 40 communication with a host processor system e.g. 70s so that certain components of reader 10 such as trigger 13t can be controlled remotely by host processor system 70s, which in one embodiment is nonintegrated. Accordingly, in reader-host communication systems as shown in FIG. 3e nonintegrated host processor assembly 68 typically is programmed to provide functions separate from those of the reader processor systems described in connection with FIGS. 3a-3d.

As described in U.S. Pat. No. 5,965,863, incorporated herein by reference, one function typically provided by nonintegrated local host processor system 70s is to create operating programs for downloading into reader 10. Processor system 70s typically has an operating system incorporated therein, such as WINDOWS, which enables an operator to develop operating programs using a graphical user interface. Nonintegrated local processor system 70s also can be configured to receive messages an/or image data from more than one reader, possibly in a keyboard wedge configuration as described in U.S. Pat. No. 6,161,760, incorporated herein by reference. It is also convenient to employ processor system 70 for data processing. For example a spreadsheet program can be incorporated in system 70s which is useful for analyzing data messages from reader 10e. An image processing application can be loaded into system 70s which is useful for editing, storing, or viewing electronic images received from reader 10e. It is also convenient to configure reader 10e to coordinate communication of data to and from a remote processor assembly such as assembly 88-1. Accordingly processor assembly 68 typically includes I/O interface 74-2 which facilitates remote communication with a remote processor assembly, e.g. assembly 88-1 as shown in FIG. 3c.

The various modes of operation of the device are now described in greater detail. A user may actuate the "message only" mode using one of a possible menu driver systems as previously explained. When trigger 13T is actuated with reader 10 in the first mode, control circuit 40 captures a frame of image data into a decoding buffer memory location, typically located within RAM 46, subjects the frame of image data within the buffer memory location to a decoding algorithm to generate a decoded-out message, then stores in a designated decoded-out message memory location of memory 45 the decoded-out message determined from application of the decoding algorithm.

The first mode is referred to as a "message only" mode despite there being a capture of a frame of image data into a buffer memory because in the first mode there is no writing of image data into a dedicated image frame storage memory location of memory 45 after the initial capturing of the image data into a buffer memory location. A designated image frame storage memory location of a memory 45 of an imaging device 10 is a memory location that is specifically designated for later access either by imaging device 10 or by an external processor system such as the processor system 70s of a host PC 68 as shown in the example of FIG. 3e or by a processor system of a remote processor assembly 88-1. Imaging devices capable of image capture are typically equipped with an image upload function which is executed when the image capture device is in communication with a host system, e.g. a PC 68 as shown by the example of FIG. 3e, or a remote host system 88-1, as indicated by the example of FIG. 3c. When the image upload function is actuated, the host processor system, e.g. system 70s typically reads several frames of image data from several designated frame storage memory locations of memory 45. Control circuit 40 typically writes a frame of image data to one of these designated frame storage memory locations when operating in the second, third, or fourth modes described herein. Unlike a decoding buffer memory location, a designated frame storage memory location is not routinely overwritten during the course of capturing image for subjecting to decoding algorithms.

In should be noted that control circuit 40 can be of a type that does not capture each new frame of image data into a single buffer memory location during the course of capturing images for decoding purposes. Instead, control circuit 40 during the course of decoding decodable indicia session may capture each newly captured image into a separate memory location of memory 45 and may attach a designation flag (such as in an allocated open byte of the image file) in the case the frame of image data is to be designated for further processing after decoding is complete. Control circuits 40 that do not utilize a decode buffer memory location during decoding attach designation flags to captured images captured during execution of the second, third, and fourth modes herein. That is, where a control circuit 40 that does not utilize a decode buffer captures a frame of image data into memory 45 while operating in accordance with the third mode, for example, control circuit 40 decodes image data represented in the frame of image data and attaches a designation flag to the captured frame of image data to indicate that the image data is to be subjected to further processing in addition to the decoding processing (such as uploading to processor system 70s, for example). Control circuit 40 thereby develops a "link list" of image files having designation flags attached thereto to designate that the frame of image data is to be subjected to further processing. The phrase "storing a frame of image data into a designated frame storage memory location" should be understood therefore to refer to both the situation where control circuit 40 transfers or copies an image frame from a decode buffer memory location of memory 45 and the situation where a control circuit 40 attaches a designation flag to a captured frame of image data captured into a memory location of memory 45 that is not a decode buffer memory location.

Various methods for decoding decodable indicia, including 1D symbols, 2D symbols, and text characters represented in captured image data are known. As has been indicated herein, reader 10 according to the invention attempts to decode decodable indicia represented in a captured frame of image data when executing the first, third, and fourth modes described herein. Specific features of algorithms for decoding decodable indicia represented in a captured frame of image data are described with reference to FIGS. 5, 6, 7, and 8.

Figure 5:
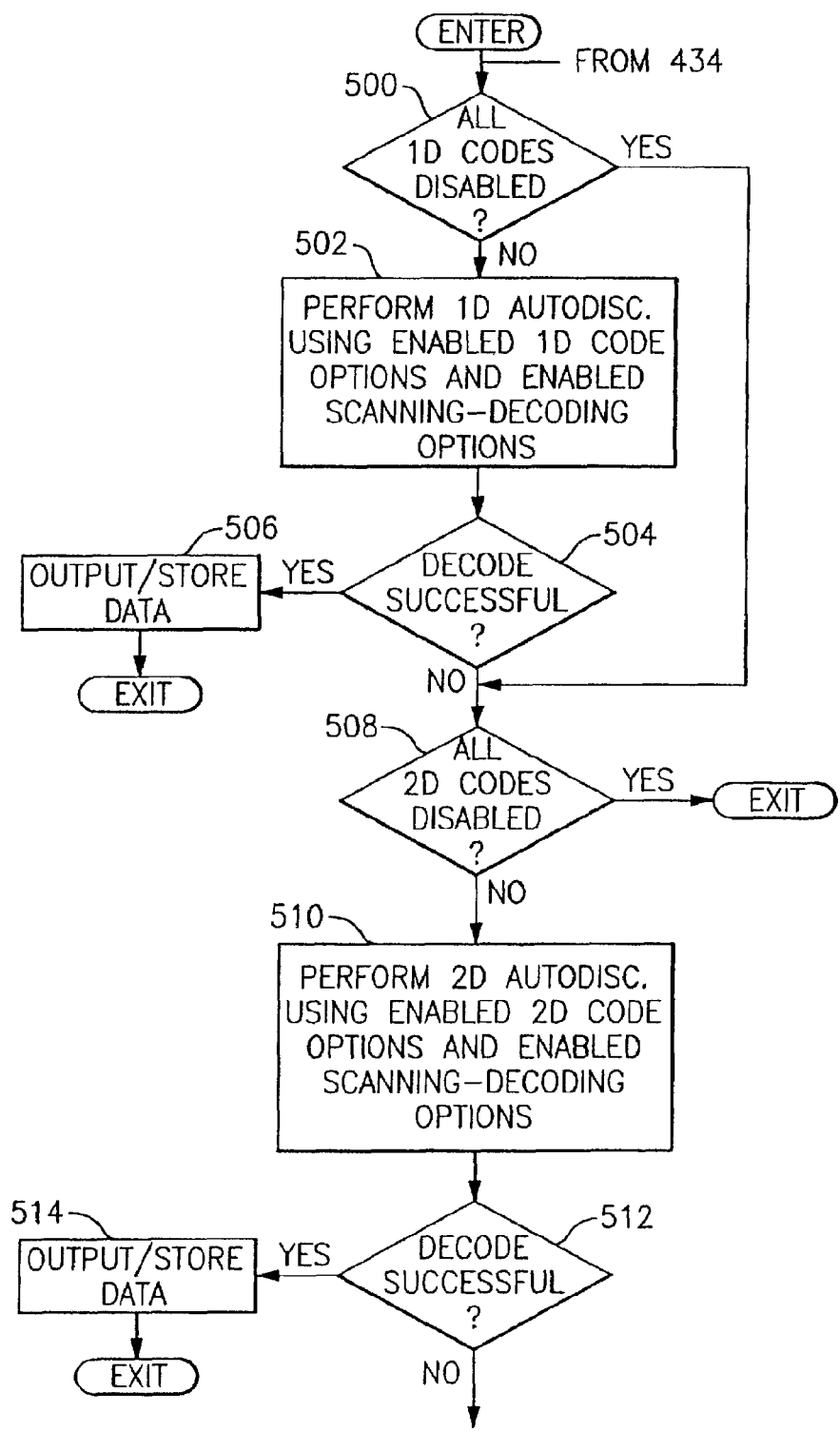
FIGS. 5-8 are flow charts illustrating various decoding functions of a reader according to the invention.

As embodied herein and depicted in FIG. 5, a flow chart showing a method for attempting to decode decodable indicia is described. In step 500, control circuit 40 refers to parameter table 64 stored in EROM 48 as described with reference to FIG. 4a. Specifically, control circuit 40 determines if the parameter table is programmed to perform 1D decoding. If the parameter table has enabled 1D processing, 1D autodiscrimination is performed. The parameter table specifies the values of the parameters that define the operational mode of the reader. Examples of these parameters include the size and frame rate of image sensor 32, codes that are enabled during bar code decoding, I/O communications protocols, OCR options, and others. If 1D decoding is successful, the decoded data is stored and possibly displayed, in accordance with the parameter table settings. If 1D codes are disabled or if 1D decoding is unsuccessful, control circuit moves on to step 508. In this step, control circuit 40 determines if any 2D codes are enabled. If the parameter table has all of the 2D codes disabled, control circuit 40 exits the bar code decoding routine. If 2D codes are enabled, 2D autodiscrimination is performed in step 510. If decoding is successful, the decoded data is either stored or output, depending on the parameters stored in the parameter table. If decoding is unsuccessful, control circuit 40 exits the routine.

Figure 6:
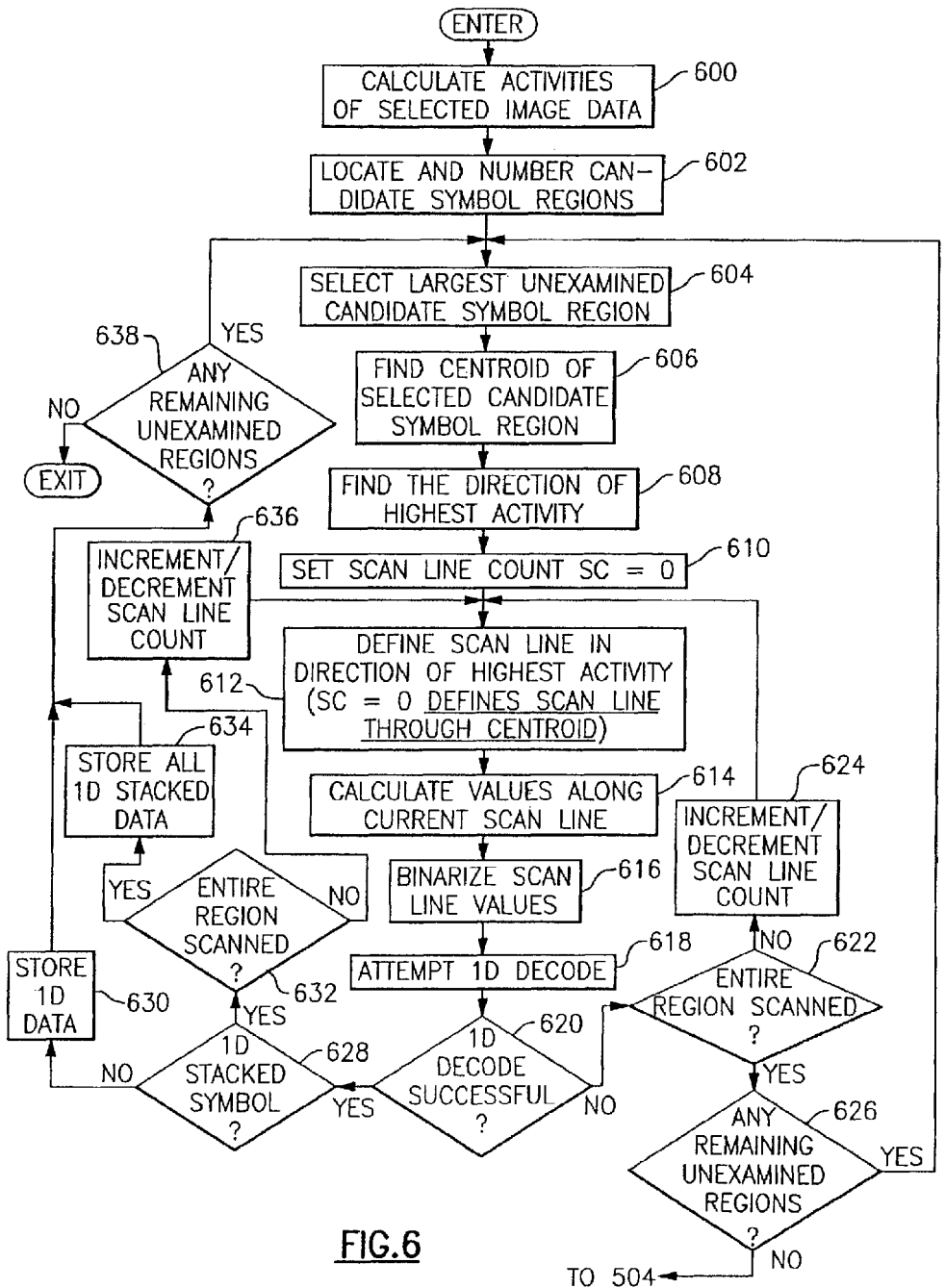

As embodied herein and depicted in FIG. 6, a flow chart showing a method for performing the 1D autodiscrimination of step 502 in FIG. 5 is disclosed. In step 600 control circuit 40 calculates the activities of selected image data elements. The activity is defined as a measure of the rate of change of the image data over a small two-dimensional portion of the region surrounding the selected data element. In one embodiment, the activity is calculated along any two arbitrarily selected directions which are orthogonal one to the other. Two mutually perpendicular directions are used because the orientation of the symbol is unknown. In step 602, control circuit 40 looks for "high activity" regions. These high activity regions are referred to as candidate symbol regions (CSRs). A high activity region indicates a transition from a black region to a white region, or vice-versa. If there is more than one CSR, it may indicate the presence of more than one bar code symbol. In step 604, control circuit 40 selects the largest CSR. In step 606, control circuit 40 calculates the centroid of the largest CSR. Subsequently, control circuit 40 finds the direction of the highest activity in the largest CSR. In a 1D bar code, this will be the direction perpendicular to the direction of the bars. In steps 610 and 612, control circuit 40 defines the initial scan line (SC=0), as being the scan line bisecting the centroid of the bar code. Control circuit 40 calculates the brightness values of sampling points along the initial scan line. These brightness values are converted to digital data in step 616. In decoding step 618, control circuit 40 applies one 1D decoding program after another. If decoding is unsuccessful, control circuit 40 checks if the entire CSR has been scanned. If not, it establishes a new scan line, and repeats the decoding process. If in step 622, the entire CSR has been scanned, and there are no CSRs remaining to be decoded, control circuit 40 exits the routine. If in step 620, 1D decoding is successful, control circuit 40 determines if the symbol is a 1D stacked symbol. If it is a 1D stacked symbol, control circuit 40 scans and decodes the remaining CSRs in the stacked symbol. If it is not a stacked symbol, the decoded 1D data is stored or output to display 60 in step 630. In step 638, control circuit 40 determines if there are any unexamined regions. If there are unexamined regions, the decoding process is repeated. Otherwise, control circuit 40 exits the routine.

Figure 7:
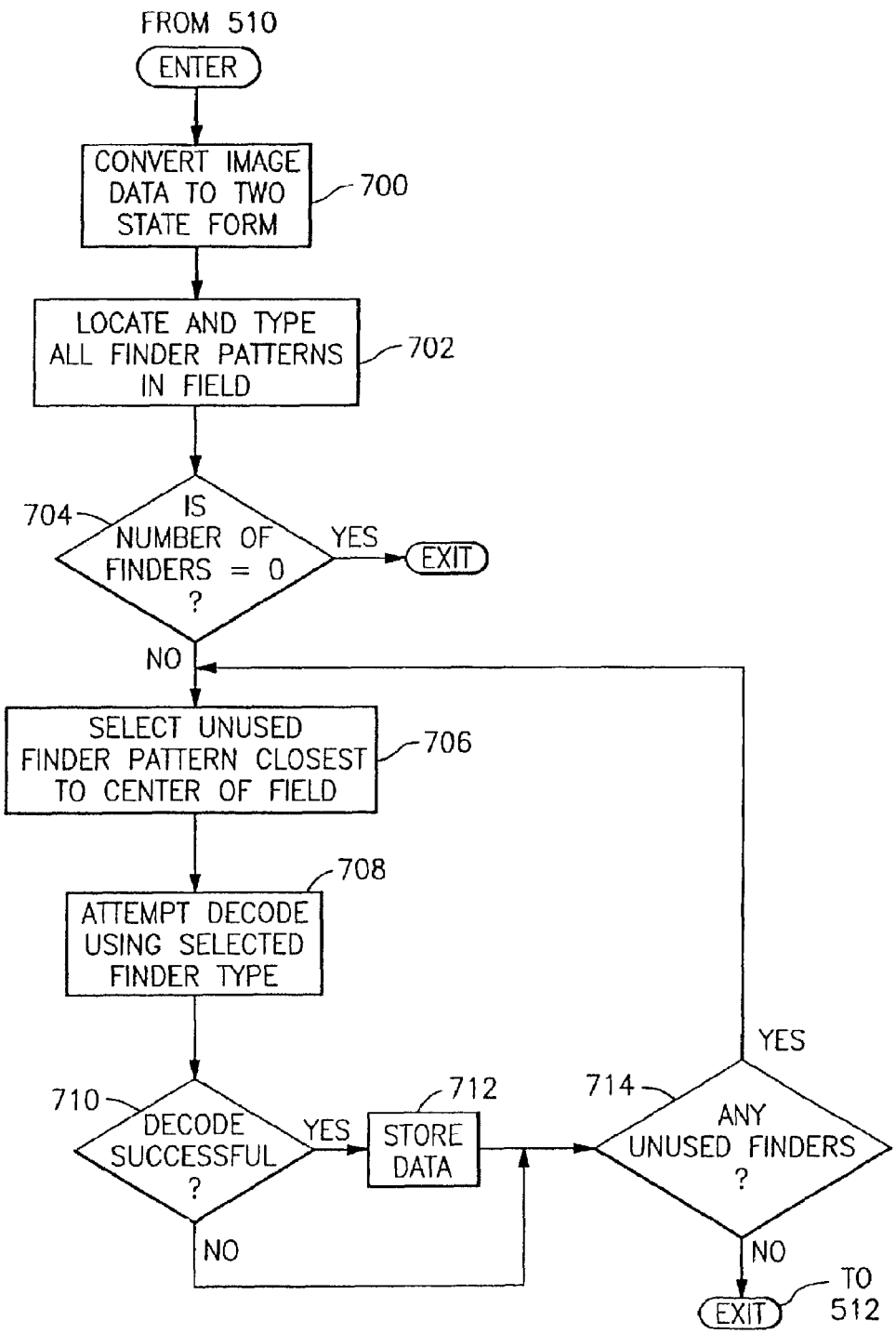

As embodied herein and depicted in FIG. 7, a flow chart showing a method for 2D autodiscrimination is disclosed. In step 700, control circuit 40 converts the image data into a two-state binarized format. In step 702, control circuit 40 locates all 2D finder patterns and identifies them by type. Pattern types include bullseye type patterns, waistband type patterns peripheral patterns, and others. If the number of finder patterns equals zero, control circuit 40 exits the routine and returns to the routine depicted in FIG. 5. If there are finder patterns, control circuit 40 locates the finder pattern closest to the center of the field of view in one embodiment of the invention. The closest-to-the-center option has an advantage in that a centrally located image is likely to be a symbol. In step 708, control circuit 40 attempts to decode the symbol in accordance with the finder type. For example, the Aztec 2D matrix symbol employs a bullseye finder pattern. The DataMatrix symbology employs a peripheral finder pattern. If the decoding is successful, the decoded data is either stored or displayed. In step 714, control circuit 40 determines if there are any other unused finder patterns. If so, the symbols corresponding to those unused patterns are decoded, and the previously described steps are repeated. Otherwise, control circuit 40 exits the routine.

Figure 8:
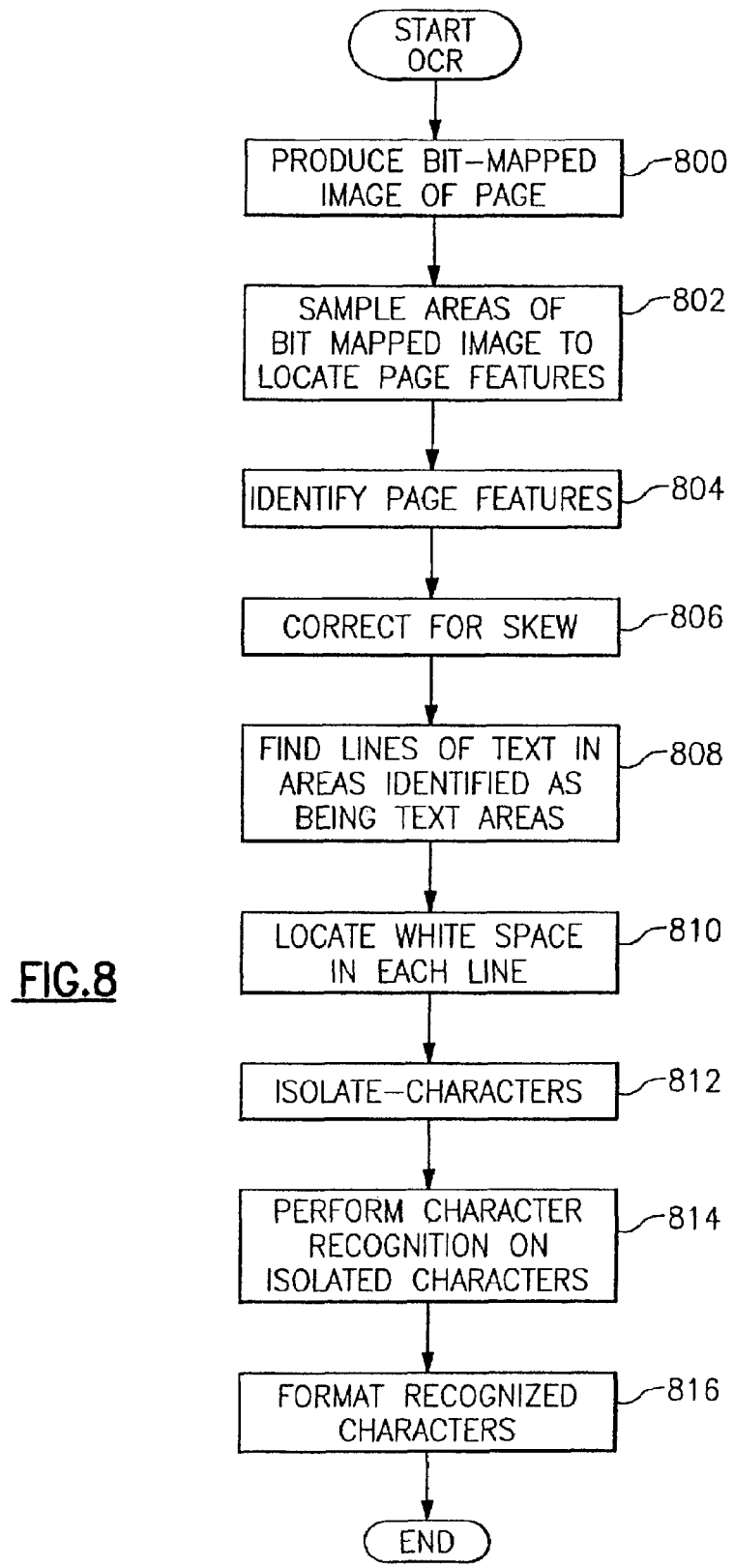

As embodied herein and depicted in FIG. 8, a flow chart showing a method for reading text is disclosed. This routine can be accessed in a number of ways. For example, the routine may be actuated automatically if symbology decoding fails. A user may also select an OCR option using an appropriate menu driver. Reader 10 can be configured so that such a selection disables symbology decoding. In step 800, an image map frame of image data is captured. In step 802, the image map is sampled. In one embodiment, this is performed by analyzing every Nth scan line of the image. The value of integer N is dependent on the resolution of the scanned image. In one embodiment the image is sampled every $\frac{1}{40}$th of an inch. This provides sufficient resolution to locate and classify the various regions on the page. By sampling every $\frac{1}{40}$th of an inch instead of every scan line, the processing and memory requirements of reader 10 are substantially reduced. In step 804, control circuit 40 identifies page features. Control circuit 40 may analyze the page and divides it into blank and non-blank portions. The non-blank portions are analyzed to distinguish text regions from non-text regions. After determining the layout of the page, control circuit 40 uses black-to-white transitions to determine degrees of skew. In step 808, horizontal white spaces are identified to separate lines of text. In step 810, vertical white spaces are identified within each line of text to thereby separate individual words and characters from each other. In step 814, a character recognition algorithm is used in an attempt to recognize each individual character. Finally, in step 816, control circuit 40 formats the recovered text before storing the text in memory 45.

Referring again to modes of operation of a reader 10 according to the invention, the second, "image only" only mode will now be described. A user selects the second mode as described previously by making a selection of an indicator corresponding to the second mode using a mode selector menu driver. When the second, "image only" mode is selected and trigger 13*t* is actuated, control circuit 40 captures or writes a frame of image data corresponding to the scene presently in the field of view of reader 10 into a designated image frame storage location of memory 45 without attempting to decode decodable indicia represented in the frame of image data. In the second mode, control circuit 40 may capture a frame of image data into a decoding buffer memory location of memory 45 and then write the frame of image data into a designated frame storage location of memory 45 without attempting to decode indecodable indicia represented therein or else control circuit 40 may bypass the decoding buffer memory location entirely and capture the frame of image data directly into a non-decoding buffer frame storage location of memory 45 as has been described herein.

The second mode is highly useful in a variety of commonly encountered decoding applications. For example, if a scene includes indicia that is decodable by way of available decoding technologies but not by reader 10 as presently configured, it is useful to select the second "image only" mode so that (1) the frame of image data corresponding to the scene can be shipped to an external processor system equipped to decode the decodable indicia, or so that (2) the reader can be reprogrammed so that it has the capacity to decode the particular type of decodable indicia in the captured image representation. Of course, the second mode is highly useful since it allows user to easily capture images for any purpose which may be unrelated to decoding during the course of operating reader 10 in accordance with a decode function.

Frame image capture functionality is available in imaging devices that are not normally equipped with decoding functionality. For example, digital cameras as depicted by the example of FIG. 2D are typically employed to capture images without attempting decode decodeable images represented therein. The frame image capturing function of the present invention is distinguished from the frame image capture function of the prior art digital camera in that the frame image capture mode of the invention is made available as a menu option out of a series of menu options wherein the alternative menu options are characterized by attempts to decode decodable indicia within captured image data by control circuit 40.

Furthermore in the second mode, control circuit 40 may be made to execute steps in furtherance of decoding decodable indicia after executing the step of storing a frame of image data into a designated frame storage memory location of memory 45. For example, after storing a frame of image data in memory 45 in the second mode, control circuit 40 of reader 10 may transmit an instruction to an external processor system e.g. processor system 70s or the processor system of assembly 88-1 so that the external processor system transmits to reader 10 a new operating program which results in reader having the capacity to decode the image data represented in the frame of image data just written to the designated frame storage memory location of memory. Control circuit 40, as reprogrammed, may be configured to automatically decode, or may later be controlled to decode decodable indicia represented in the frame of image data stored in the designated frame storage memory location of memory 45. In addition, as part of the second mode, control circuit 40 after writing a frame of image data into a designated frame storage memory location of memory 45 may be made to transmit the stored frame of image data, or a copy thereof, to an external processor system such as host processor system 70s or a processor system of remote processor assembly 88-1 together with complementary instructions instructing the external processor system, e.g. system 70s or a system of assembly 88-1 to decode any decodable indicia in the frame of image data and to transmit a decoded-output message yielded by such decoding back to reader 10. When receiving the frame of image data and complementary instructions, the external processor system, e.g. system 70s or system of assembly 88-1 may then automatically decode the decodable indicia represented in the frame of image data and transmit the decoded-output message back to reader 10.

Referring now to the third, "image and message" mode, the third mode may be actuated by selecting a menu option out of a series of menu options as in the first and second modes. When operating in the third mode, actuation of trigger 13T results in control circuit 40 capturing a frame of image data corresponding to a scene presently in the field of view of reader into a buffer memory location of memory 45, attempting to decode decodable indicia represented in the frame, and storing both frame of image data and its associated decoded-out into a designated frame storage location of memory 45 or into a set of designated image and message storage locations of memory 45.

The fourth mode of operation, the "two-step message and image", is similar to the third mode except that the fourth mode involves two image capturing steps instead of one. The fourth mode may be actuated, as in the first second and third modes by selecting an appropriate menu option out of a series of menu options as explained with reference to FIG. 1a. When the fourth mode is active, actuation of trigger 13T a first time results in control circuit 40 capturing a frame of image data into a buffer memory location of memory 45, subjecting the frame of image data to decoding, and writing the decoded-output message resulting from application of the decoding algorithm to a designated message storage location of memory 40 or to a temporary memory location, as will be explained later herein. Actuation of trigger 13T a second time when reader 10 operates in the fourth mode results in a frame of image data corresponding to the scene presently in the field of view of reader 10 being captured into or written into a designated frame image storage location of memory 10. Of course, the ordering of the decode and image storage image capturing steps in the fourth mode may be reversed.

It will be seen that the frame of image data that is associated with decoded-output message data in the fourth mode will not necessarily comprise an image representation of the decodable indicia from which the decoded-output message is generated. In the fourth mode, the frame of image data associated with a decoded-output message can be any image a user wishes to associate with a decoded-output message. For example, a user may actuate the fourth mode a first time to associate a large field image representation of a front side of package which may or may not comprise a representation of the indicia corresponding to the decoded-output message (of resolution that is insufficient for decoding), and actuate the fourth mode a second time to associate a large field view of a back side of a package that does not comprise a representation of a decodable indicia. The user may then actuate the fourth mode a third time to associate a decoded-output message with yet another image representation such as an image representation of the trailer box on which the package was loaded.

Furthermore, it will be seen that a reader according to the invention can have other modes of operations wherein more than one frame of image data is associated with a decoded-out message, wherein more than one decoded-out message is associated with a frame of image data written to designated frame storage location of memory 45, or wherein multiple decoded messages are associated with multiple frames of image data. The other modes of operation may require more than the pair of image capture steps required in the fourth mode of operation. Of course, useful embodiments of the invention can also have less than all of the four modes of operation explained in detail herein.

In both the third and fourth modes, decoded-out message data is associated with image data. Message data can be associated with image data in a number of useful ways in the third and fourth modes.

Figures 9A, 9B:
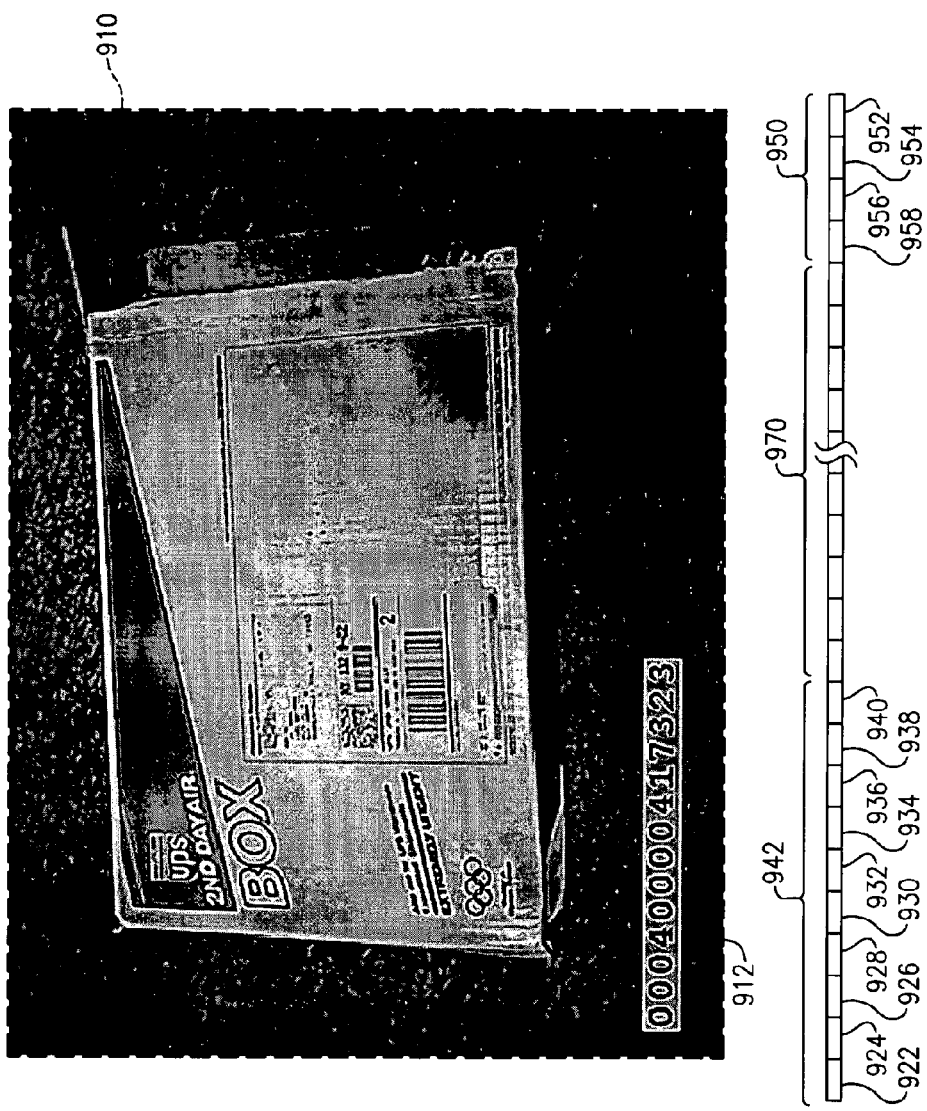
FIG. 9a shows a printed image representation corresponding to a frame of image data having a window comprising an image representation of a decoded message.
FIG. 9b is a diagram illustrating a typical architecture of an image file.

For example, according to a first method for associating image and message data as shown by the example of FIG. 9a, message data can be converted into image data, and the image representation of the message data can be stitched into a part of the frame of image data. FIG. 9a shows a printed-out frame of image data. Image data frame 910 included a stitched in window region 912 including an image representation of the decoded-out message. If operating in the third mode and executing the message and image association illustrated by FIG. 9a, control circuit 40 generates a decoded-out message by subjecting frame 910 to decoding, converting the decoded-out message into an image representation of the message data, and stitching in an image representation of the decoded-out message data into frame. If operating in the fourth mode and executing the message-image association method as illustrated with reference to FIG. 9a, control circuit 40 generates a decoded-out message by subjecting a frame other than frame 910 to decoding, converting the decoded-out message into an image representation of the message data, and stitching in an image representation of the decoded-out message data into frame 910.

According to another method for associating decoded-out message data and image data, control circuit 40 stores decoded-out message data into a designated message data storage location of memory 45 separate from a designated image data storage location of memory 45, without converting the message data into an image representation of message data.

Another highly useful method for associating decoding-out message data with image data is described with reference to FIG. 9b. According to the method described with reference to FIG. 9b decoded-out message data is stored in an image file without converting the decoded-out message data into an image representation of the message data. FIG. 9b shows a typical software architecture for an image file. Image file 920 in one of an available formats (such as .BMP, or .TIFF or .PDF, etc.) may have a header and/or tail bytes that describes characteristics of the image file. For example, a first byte 922 of file 920 may comprise data describing the image size in bytes. Second byte 924 may comprise data describing the number of bytes of file 920 in the X dimension. Third byte 926 may comprise data describing the number of bytes of file 920 in the Y dimension. Fourth byte 928 may comprise data describing compression information. Fifth byte 930 may comprise data describing color information related to file 920. Sixth byte 932 may comprise pointer data pointing to a byte location of image data of file 920. The first through tenth bytes 922, 924, 926, 928, 930, 932, 934, 936, 938, and 940 may be termed a header 942 of file 920. File 920 may also include a tail 950 having bytes 952 and 960 comprising file characterizing data. Pixel or image data bytes, e.g. bytes 970 typically follow the bytes of header 942. Importantly, either or both of header 942 and tail 950 include at least one allocated open byte, e.g. byte 934, 936, 938, and 958 which are available for storage of user-defined data.

According to the method of the message and image association described with reference to FIG. 9b control circuit 40 stores decoded-out message data within the designated image storage memory location of memory 45 by writing the decoded-out message data to at least one allocated open memory space, e.g. open byte 934, of a header 942 tail 950 or of an image file, e.g. file 920. It is seen that the methods of message and image association described with reference to FIGS. 9a and 9b allow transmissions of combined message and image data between processor systems, e.g. system 40 and system 70s using a standard image file data transmission protocol.

The message-image association method described with reference to FIG. 9a is highly useful since it allows message data to readily be viewed in connection with image data that has been associated with the message data. However, when the method of message and image association described with reference to FIG. 9a is not used in combination with another message-image association method, the image data represented within window 912 must be subjected to decoding to retrieve the message data from the image representation of the message data. In order to avoid the requirement of redecoding the message data from an image representation of the message data, it is highly useful to combine the method of message and image association described with reference to FIG. 9a with the method of message and image association described with reference to FIG. 9b. That is, according to one embodiment, control circuit 40 when operating in the third or fourth modes, both creates an image representation of the decoded-out message and stitched the image representation into the image frame as described in connection with FIG. 9a, and writes to an allocated open byte of the image file the decoded-out data message as explained with reference to FIG. 9b.

The third and fourth modes of operation as described herein are highly useful in the case supplementary decoding may be desired. With the number of decodable types of indicia ever expanding, the situation is a common one where a scene includes multiple types of decodable indicia but the reader capturing an image representation of the scene is configured to read only some of them. For example, reader 10 may be presently equipped to decode 1D symbols only and a scene may include 1D symbols, 2D symbols and decodable text strings. The third or fourth modes of operation as explained herein can be actuated in the case that a scene includes at least one decodable indicia that can be decoded by reader 10 as presently configured and at least one decodable indicia that cannot be decoded by reader 10 as presently configured. The third or fourth modes can be actuated so that reader 10 decodes the presently decodable indicia of the scene and associates an image representation with the decoded-out message. As explained in the description of the second mode herein, control circuit 40, either automatically or upon a user request, may then transmit the image representation to an external processor assembly, e.g. assembly 68 or 88-1 for decoding, which may transmit the decoded message back to reader 10, or may transmit a request to an external processor assembly e.g. assembly 68 or 88-1 to reprogram reader 10 so that reader 10 is reconfigured for reading the previously unreadable indicia.

The third and fourth modes of operation as described herein are also highly useful for fraud detection. It is seen from FIG. 9a that actuation of the third or fourth modes allows message data such as that shown in window 912 to be viewed simultaneously with an image representation 910 of a scene, often with use of processor assembly external from reader 10 such as processor assembly 68 or assembly 88-1.

In one method of fraud involving decodable indicia known as transposition fraud decodable symbols are lifted from or copied from a first item and placed on a second item.

The first item may be, for example, a retail product of lower value and the second item may be a retail product of higher value. The first item may also be, for example, an identification card owned by a person over 21 and the second item may be an identification card owned by a person under 21. Because it is common to allocate narrow classes of bar code decoded-out messages with narrow categories of items, the third and fourth modes, allow for a user of reader 10 or of a processor system in communication with reader 10 in many cases to quickly determine whether there has been a transposition fraud by simultaneous observation of a scene image representation and a decoded-out message.

The third and fourth modes also allow convenient observation of indicia bearing or transaction associated objects for such purposes as product or package tampering or damage. It is seen that the second, "image only" mode of operation described herein is also useful for purposes of fraud, tamper, or damage detected explained with reference to the third and fourth modes.

Particularly when the message-image associated method described with reference to FIG. 9b is executed, the third and fourth modes of operation explained herein are also highly useful for image indexing purposes. It is seen that writing decoded-out message data to at least allocated open byte location of several image files (e.g. open byte 934 of file type 920) creates a readily searchable database of image files, wherein each file is indexed by the decoded-out message associated with the captured image frame, as determined by the decodable indicia yielding the decoded-out message. When such a database is created, any one image file in the database can be readily accessed using a processor system that stores or is in communication with the image file database such as processor system 40, 70, or the processor system of assembly 88-1. A particular one image file of the image file database can be accessed by commanding the processor system storing or in communication with the database to search for a particular decoded-out message in the at least one allocated open byte location (e.g., byte 934 of file type 920) of the various stored image data frame image files.

Figure 10:
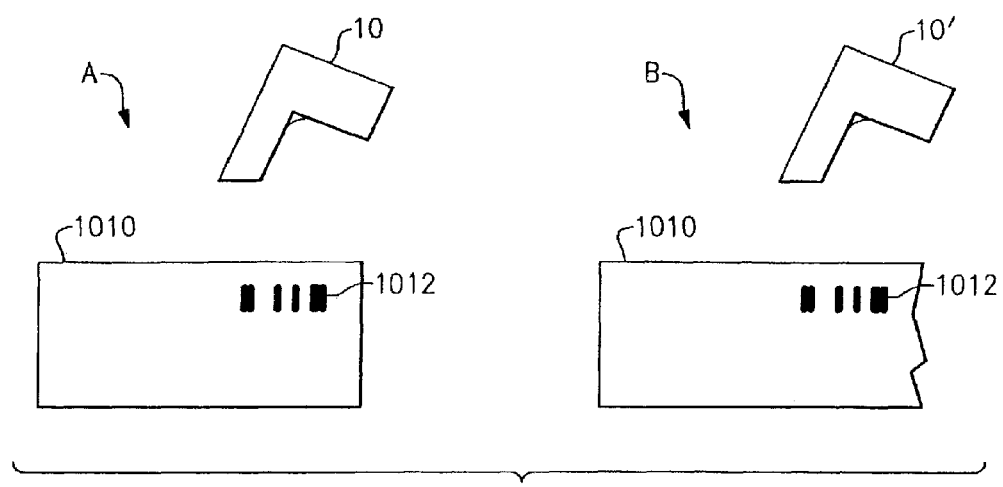
FIG. 10 is a diagram of illustrating aspects of an image index function of the invention.

The utility of such an indexing function and further aspects of the image indexing function are illustrated by way of example. Referring to FIG. 10 consider the example of an indicia bearing package 1010 bearing a decodable indicia 1012 that is transported from location A to location B located a long distance (e.g., several miles) from location A. At location A, mode four may be actuated by a first user using a first reader 10 to associate a decoded message corresponding to indicia 1012 with an image representation of package 1010. The first user may then control reader 10 to transmit the indexed image file representation of package 1010 as indexed by the decoded-out message corresponding to indicia 1012 to central database stored in the processor system of remote processor assembly 88-1. Some time later, a second user at the receipt location B having a second reader 10' as illustrated in the communication system of FIG. 3c, may receive package 1010 and notice that package 1010 is damaged. The user at location B may then read indicia 1012 using second reader 10' and also in communication with assembly 88-1 as depicted in FIG. 3c and upload the decoded-out message corresponding to indicia 1012 either to remote processor assembly 88-1 or to remote processor assembly 88-1 through an external local processor system such as system 70s. Using the decoded-out message corresponding to indicia 1012 as an image file index identifier, the user at receipt location B may search the image file database of remote assembly 88-1 to retrieve the image file associated with package 1010 taken at location A in order to determine whether package 1010 was damaged during transport from location A to location B.

While the present invention has been explained with reference to the structure disclosed herein, it is not confined to the details set forth and this invention is intended to cover any modifications and changes as may come within the scope of the following claims.

I claim:

1. A method for decoding decodable indicia using an imaging device, said method comprising:
    capturing a frame of image data corresponding to a scene using said imaging device, said scene having first decodable indicia which said imaging device is presently equipped to decode, and second decodable indicia which said imaging device is not presently equipped to decode;
    decoding said frame of image data at said imaging device to produce a first decoded-out message corresponding to said first decodable indicia;
    transmitting image data of said frame of image data to an external processor assembly for decoding of said second decodable indicia by said external processor assembly; and
    receiving at said imaging device from said external processor assembly a decoded-out message corresponding to said second decodable indicia.

2. The method of claim 1, wherein the transmitting is performed responsively to a user request.

3. The method of claim 1, wherein the transmitting is performed automatically.

4. The method of claim 1, wherein the transmitting image data includes transmitting the frame of image data.

5. The method of claim 1, wherein the external processor assembly is a remote processor assembly.

6. The method of claim 1, wherein the imaging device is a portable imaging device.

7. The method of claim 1, wherein the first decodable indicia is a decodable symbol.

8. The method of claim 1, wherein the second decodable indicia is a decodable character.

9. A method for decoding decodable indicia using an imaging device, said method comprising:
    capturing a frame of image data corresponding to a scene using said imaging device, said scene having first decodable indicia which said imaging device is presently equipped to decode, and second decodable indicia which said imaging device is not presently equipped to decode;
    decoding said frame of image data at said imaging device to produce a first decoded-out message corresponding to said first decodable indicia;
    transmitting a request to an external processor assembly to download to said imaging device resources for decoding said second decodable indicia; and
    receiving at said imaging device the resources for decoding of said second decodable indicia so that said imaging device is configured to decode said second decodable indicia represented in said frame of image data.

10. The method of claim 9, wherein said frame of image data is a frame of image data just written to a memory location of said imaging device at a time of said receiving.

11. The method of claim 9, wherein the method includes attempting to decode the second decodable indicia at the imaging device responsively to the receiving.

12. The method of claim 9, wherein the imaging device is a portable imaging device.

13. The method of claim 9, further including storing said frame of image data to a frame storage location.

14. The method of claim 9, wherein the external processor assembly is a remote processor assembly.

15. The method of claim 9, wherein the first decodable indicia is a decodable symbol.

16. The method of claim 9, wherein the second decodable indicia is a decodable character.

17. The method of claim 9, wherein the resources comprise program code.

* * * * *